(12) United States Patent
Gupta et al.

(10) Patent No.: US 11,468,786 B2
(45) Date of Patent: Oct. 11, 2022

(54) GENERATING TOOL-BASED SMART-TUTORIALS

(71) Applicant: Adobe Inc., San Jose, CA (US)

(72) Inventors: Subham Gupta, Uttarakhand (IN); Poonam Bhalla, New Dehli (IN); Krishna Singh Karki, New Delhi (IN); Ajay Bedi, Hamirpur (IN)

(73) Assignee: Adobe Inc., San Jose, CA (US)

( * ) Notice: Subject to any disclaimer, the term of this patent is extended or adjusted under 35 U.S.C. 154(b) by 277 days.

(21) Appl. No.: 16/654,737

(22) Filed: Oct. 16, 2019

(65) Prior Publication Data

US 2021/0118325 A1 Apr. 22, 2021

(51) Int. Cl.
| | |
|---|---|
| *G06F 3/048* | (2013.01) |
| *G09B 19/00* | (2006.01) |
| *G09B 5/02* | (2006.01) |
| *G06T 13/80* | (2011.01) |
| *G06F 3/0482* | (2013.01) |

(52) U.S. Cl.
CPC .......... *G09B 19/003* (2013.01); *G06T 13/80* (2013.01); *G09B 5/02* (2013.01); *G06F 3/0482* (2013.01); *G06T 2200/24* (2013.01)

(58) Field of Classification Search
CPC ...... G06F 3/016; G06F 9/453; G06F 3/04815; G06F 3/04847; G06F 3/0484; G06F 16/35; G06F 8/34; G06N 20/00; G06N 3/08; G06N 5/003; G06T 19/20; G06V 20/46; G06V 10/50
See application file for complete search history.

(56) References Cited

U.S. PATENT DOCUMENTS

| | | | | |
|---|---|---|---|---|
| 5,442,759 | A  * | 8/1995 | Chiang | G06Q 50/205 434/118 |
| 6,833,847 | B1 * | 12/2004 | Boegner | G06F 9/453 715/705 |
| 7,415,714 | B2 * | 8/2008 | Chapman | G09B 7/02 715/781 |
| 7,878,808 | B1 * | 2/2011 | Stumm | G09B 5/12 434/118 |
| 8,635,584 | B2 * | 1/2014 | Jones | G06F 9/453 717/100 |
| 9,348,615 | B1 * | 5/2016 | Clark | G06F 9/453 |
| 9,649,556 | B1 * | 5/2017 | Curtis | G09B 5/02 |
| 9,704,231 | B1 * | 7/2017 | Kulewski | G06V 10/40 |
| 10,088,996 | B2 * | 10/2018 | Arning | G06F 3/04895 |

(Continued)

*Primary Examiner* — Steven B Theriault
(74) *Attorney, Agent, or Firm* — Keller Preece PLLC

(57) ABSTRACT

The present disclosure relates to systems, non-transitory computer-readable media, and methods that generate dynamic tool-based animated tutorials. In particular, in one or more embodiments, the disclosed systems generate an animated tutorial in response to receiving a request associated with an image editing tool. The disclosed systems then extract steps from existing general tutorials that pertain to the image editing tool to generate tool-specific animated tutorials. In at least one embodiment, the disclosed systems utilize a clustering algorithm in conjunction with image parameters to provide a set of these generated animated tutorials that showcase diverse features and/or attributes of the image editing tool based on measured aesthetic gains resulting from application of the image editing tool within the animated tutorials.

20 Claims, 17 Drawing Sheets

(56) References Cited

U.S. PATENT DOCUMENTS

| | | | |
|---|---|---|---|
| 10,175,999 B2* | 1/2019 | Jemiolo | G06K 9/6202 |
| 10,248,441 B2* | 4/2019 | Singh | G06F 3/167 |
| 10,353,721 B2* | 7/2019 | Patel | G06F 8/38 |
| 10,628,185 B1* | 4/2020 | Gupta | G06F 3/0481 |
| 10,706,356 B1* | 7/2020 | Doyle | G06F 16/254 |
| 10,769,738 B2* | 9/2020 | Chang | G06F 8/30 |
| 10,769,826 B2* | 9/2020 | Azmoon | G06Q 10/06 |
| 10,818,058 B1* | 10/2020 | Gupta | G06F 3/0482 |
| 10,867,281 B2* | 12/2020 | Agarwal | G06Q 50/01 |
| 10,885,808 B2* | 1/2021 | Saunders | G09B 19/00 |
| 10,901,762 B1* | 1/2021 | Kuklinski | H04N 21/2743 |
| 11,086,645 B1* | 8/2021 | Gupta | G06F 9/453 |
| 11,150,875 B2* | 10/2021 | Brockschmidt | G06F 8/33 |
| 2001/0019330 A1* | 9/2001 | Bickmore | G06T 13/40 |
| | | | 345/473 |
| 2002/0168616 A1* | 11/2002 | Chan | G09B 7/02 |
| | | | 434/118 |
| 2003/0167163 A1* | 9/2003 | Glover | G06F 16/355 |
| | | | 704/9 |
| 2004/0199901 A1* | 10/2004 | Chapman | G09B 7/02 |
| | | | 717/123 |
| 2005/0216431 A1* | 9/2005 | Baker | G06F 40/186 |
| 2006/0116979 A1* | 6/2006 | Jung | G06F 16/245 |
| 2006/0228689 A1* | 10/2006 | Rajaram | G09B 5/14 |
| | | | 434/350 |
| 2007/0015118 A1* | 1/2007 | Nickell | G09B 7/02 |
| | | | 434/118 |
| 2008/0096174 A1* | 4/2008 | Bodlaender | G09B 5/06 |
| | | | 434/308 |
| 2008/0160492 A1* | 7/2008 | Campbell | G09B 19/00 |
| | | | 434/379 |
| 2008/0189612 A1* | 8/2008 | Zhang | G06F 9/453 |
| | | | 715/709 |
| 2008/0229198 A1* | 9/2008 | Jung | G06Q 10/06 |
| | | | 715/708 |
| 2010/0180292 A1* | 7/2010 | Epstein | H04N 21/4316 |
| | | | 725/32 |
| 2011/0066998 A1* | 3/2011 | Scandura | G06N 5/022 |
| | | | 717/100 |
| 2011/0225494 A1* | 9/2011 | Shmuylovich | G06F 3/04883 |
| | | | 715/705 |
| 2012/0021828 A1* | 1/2012 | Raitt | A63F 13/497 |
| | | | 463/31 |
| 2012/0095951 A1* | 4/2012 | Ray | G06N 5/025 |
| | | | 706/47 |
| 2013/0129316 A1* | 5/2013 | Dontcheva | H04N 5/76 |
| | | | 386/241 |
| 2013/0266924 A1* | 10/2013 | Zelin | G09B 7/00 |
| | | | 434/362 |
| 2013/0294745 A1* | 11/2013 | Xu | H04N 5/76 |
| | | | 386/241 |
| 2014/0298162 A1* | 10/2014 | Cohen | G06F 40/103 |
| | | | 715/234 |
| 2014/0310596 A1* | 10/2014 | Lafreniere | G06F 3/0481 |
| | | | 715/708 |
| 2015/0050631 A1* | 2/2015 | Reynaldo | G09B 5/06 |
| | | | 434/308 |
| 2015/0121217 A1* | 4/2015 | O'Donoghue | G06Q 30/0185 |
| | | | 715/708 |
| 2015/0213726 A1* | 7/2015 | Holtzman | G09B 5/06 |
| | | | 434/365 |
| 2016/0162587 A1* | 6/2016 | Martinez | G06F 9/453 |
| | | | 707/706 |
| 2016/0349978 A1* | 12/2016 | Gonsalves | H04L 65/4015 |
| 2016/0364117 A1* | 12/2016 | Arning | G06F 3/04847 |
| 2017/0010903 A1* | 1/2017 | Kidron | G11B 27/031 |
| 2017/0076474 A1* | 3/2017 | Fu | G06V 20/20 |
| 2017/0269945 A1* | 9/2017 | Patel | G06F 3/0484 |
| 2018/0052580 A1* | 2/2018 | Clark | G06F 3/04817 |
| 2018/0089497 A1* | 3/2018 | Romanenko | G06K 9/00221 |
| 2018/0158355 A1* | 6/2018 | Ben-Naim | G06Q 50/20 |
| 2018/0189077 A1* | 7/2018 | Gupta | G06F 3/0482 |
| 2018/0349153 A1* | 12/2018 | Brillante | G06F 3/0481 |
| 2018/0352227 A1* | 12/2018 | Kobayashi | G06T 11/20 |
| 2019/0022520 A1* | 1/2019 | Leeming | G06F 8/34 |
| 2019/0096280 A1* | 3/2019 | Saunders | G09B 5/02 |
| 2019/0287197 A1* | 9/2019 | Chang | G09B 5/02 |
| 2020/0035112 A1* | 1/2020 | Delaney | G06F 16/24578 |
| 2020/0104102 A1* | 4/2020 | Brockschmidt | G06N 5/003 |
| 2020/0202735 A1* | 6/2020 | Santos-Sheehan | G09B 5/06 |
| 2021/0097084 A1* | 4/2021 | Gupta | G06F 16/24578 |

\* cited by examiner

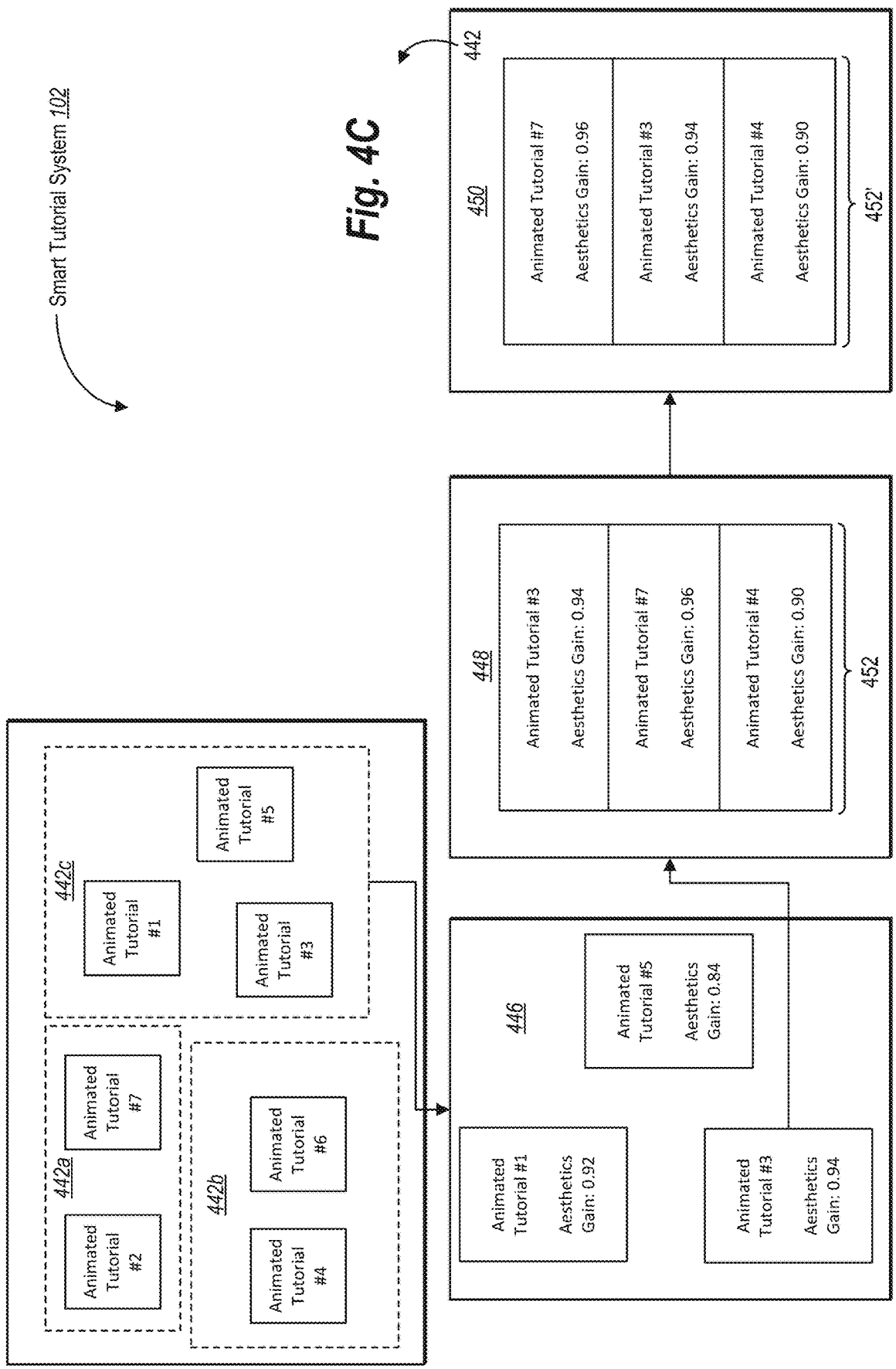

GENERATING TOOL-BASED SMART-TUTORIALS

BACKGROUND

Recent years have seen significant improvement in hardware and software platforms for editing digital images on client devices. Indeed, conventional editing systems often provide digital tutorials that illustrate how client devices can implement modifications to digital images utilizing various features of the conventional editing systems. For example, conventional systems can provide access to tutorial libraries that illustrate workflows for how to transform an input digital image into an enhanced digital image utilizing various available tools. Although conventional systems include and allow access to tutorial libraries, conventional systems are often rigid in providing static, homogenous tutorials to client devices; inefficient in using computer resources in providing lengthy, time-consuming digital content; and inaccurate in selecting and providing digital content to individual client devices.

SUMMARY

One or more embodiments provide benefits and/or solve one or more of the foregoing or other problems in the art with systems, methods, and non-transitory computer readable storage media that dynamically generate and provide tool-based animated tutorials. In particular, the disclosed systems can dynamically generate succinct animated tutorials that are specific to a particular editing tool requested by a client device. For example, in some embodiments the disclosed systems generate new animated tutorials related to a target editing tool by analyzing existing tutorials and extracting steps that utilize the target editing tool. The disclosed systems can analyze these extracted steps (e.g., by clustering the steps according to modifications in editing parameters) to identify those steps that illustrate different features and functionalities for the target editing tool. The disclosed systems can then generate a plurality of unique animated tutorials focused on different features of the target editing tool and provide the plurality of tutorials in a cross-platform format for utilization in different image editing applications on various client devices. The disclosed systems can also provide the plurality of unique tutorials to a client device with before-and-after digital images that provide an accurate reflection of the modifications portrayed in each animated tutorial. In this manner, the disclosed systems can efficiently and accurately generate flexible, targeted tutorials that illustrate the full range of functionality associated with a targeted editing tool requested by particular client devices.

Additional features and advantages of one or more embodiments of the present disclosure will be set forth in the description that follows.

BRIEF DESCRIPTION OF THE DRAWINGS

The detailed description is described with reference to the accompanying drawings in which:

FIG. 4C illustrates a diagram of selecting a set of animated tutorials based on aesthetics gains and providing the set of animated tutorials in accordance with one or more embodiments;

DETAILED DESCRIPTION

Figure 1:
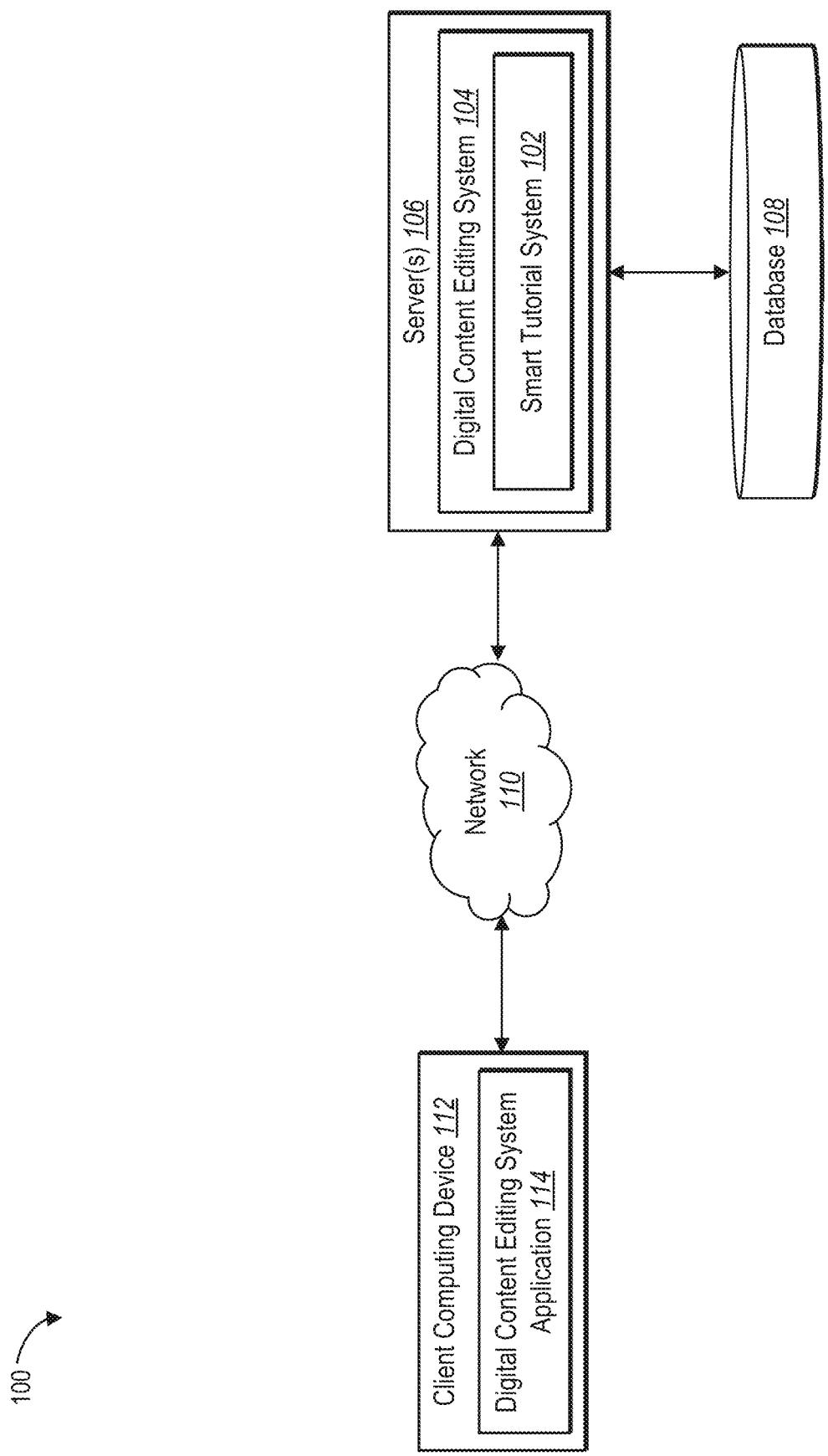
FIG. 1 illustrates an example environment in which a smart tutorial system operates in accordance with one or more embodiments.

One or more embodiments of the present disclosure includes a smart tutorial system that generates tool-based smart tutorials for client computing devices. In particular, the smart tutorial system can dynamically generate sets of animated tutorials that illustrate various functions or features corresponding to target editing tools. For example, the smart tutorial system can generate cross-platform animated tutorials corresponding to an image editing tool by extracting steps related to the image editing tool from existing animated tutorials. The smart tutorial system can determine different features or functions corresponding to the new animated tutorials by generating clusters based on changes to editing parameters corresponding to the extracted steps. Furthermore, the smart tutorial system can select particular animated tutorials to provide to client devices based on aesthetic gains resulting from the animated tutorials. The smart tutorial system can also provide animated tutorials for display with before-and-after digital images that illustrate the particular features modified for each tool-specific animated tutorial. In this manner, the smart tutorial system can efficiently and accurately generate and provide a diverse set of animated tutorials that reflect a range of features corresponding to an image editing tool specifically targeted to a particular client device.

To illustrate, the smart tutorial system can receive a request from a client device for animated tutorials corresponding to a particular image editing tool. In response to this request, the smart tutorial system can generate new animated tutorials for the image editing tool from existing tutorials. After generating the animated tutorials for the image editing tool, the smart tutorial system can determine aesthetics gains associated with each generated animated tutorial, and cluster the animated tutorials based on how the image editing tool is utilized in each animated tutorial. Based on these clusters and the determined aesthetic gains, the smart tutorial system can select a set of animated tutorials from the clusters of animated tutorials to surface to the client device.

As mentioned above, in one or more embodiments, the smart tutorial system generates animated tutorials corresponding to an image editing tool by identifying and utilizing existing animated tutorials. For example, the smart tutorial system can search a historical tutorial repository to identify existing animated tutorials that include at least one step that is directed to the image editing tool. After identifying existing animated tutorials that utilize the image editing tool, the smart tutorial system can isolate and extract those steps that are directed to the image editing tool. The smart tutorial system can then generate new animated tutorials from these steps.

For example, in one or more embodiments, the smart tutorial system generates new animated tutorials in a cross-platform format that can be utilized by multiple image editing applications. In particular, the smart tutorial system can configure the extracted steps into a portable tutorial format that can be executed across different image editing applications that utilize the editing tool. To illustrate, a first image editing application and a second image editing application can both utilize an image lightening tool. The smart tutorial system can generate a new animated tutorial in a portable tutorial format such that the first image editing application and the second image editing application can execute the portable tutorial format and illustrate how to use the image lightening tool within each image editing application. Thus, the first image editing application can implement the animated tutorial and illustrate a first set of user interface elements in a first set of locations for utilizing the editing tool. The second image editing application can implement the animated tutorial and illustrate a second set of user interface elements in a second set of locations for utilizing the editing tool.

As mentioned above, in some embodiments, the smart tutorial system can identify animated tutorials that illustrate a range of features for an image editing tool by generating clusters from a plurality of animated tutorials. For example, the smart tutorial system can apply a clustering algorithm to assign the new animated tutorials to different clusters. Specifically, in some embodiments, the smart tutorial system applies a clustering algorithm to attributes corresponding to an editing tool (e.g., brightness, hue, or other attributes). The smart tutorial system can generate clusters based on these attributes to group the new animated tutorials based on the particular features or attributes modified in each new animated tutorial. In this manner, the smart tutorial system can group new animated tutorials based on how the new animated tutorials apply different features or functionalities of the same editing tool.

In one or more embodiments, the smart tutorial system further ranks the animated tutorials in the one or more clusters based on aesthetics gains. To illustrate, the smart tutorial system can determine aesthetic gains by comparing a first digital image prior to application of the editing tool and a second digital image after application of the editing tool in an animated tutorial. The smart tutorial system can then surface animated tutorials to a client device from various clusters based on the aesthetic gains. For example, in some embodiments, the smart tutorial system provides for display the animated tutorial with the highest aesthetic gain from each generated cluster.

The smart tutorial system can further provide to the client computing device an ordered listing of animated tutorials corresponding to the selected editing tool. For example, after selecting animated tutorials to display (e.g., from each generated cluster), the smart tutorial system can compile the identified animated tutorials into a list. The smart tutorial system can further order that list based on the aesthetic gains associated with each animated tutorial. Accordingly, the smart tutorial system can generate and provide a list of animated tutorials that are specific to a target editing tool, that result in large gains in image quality, and that showcase a diverse range of features and attributes associated with the selected editing tool.

In at least one embodiment, in order to further optimize the ordered listing of animated tutorials for the client computing device, the smart tutorial system generates dynamic before-and-after digital images for each animated tutorial. For example, the smart tutorial system can identify a first set of parameters from an animated tutorial prior to application of the selected editing tool. The smart tutorial system can further identify a second set of parameters from the animated tutorial after application of the selected editing tool. Utilizing the first and second sets of parameters, the smart tutorial system can then generate a digital image that reflects both sets of parameters. In at least one embodiment, the resulting effect is that the dynamic before-and-after digital image shows what the digital image looked like before the editing tool was applied in the animated tutorial and what the digital image looked like after the editing tool was applied in the animated tutorial (e.g., a "split-screen" image).

As mentioned above, conventional systems have a number of technical shortcomings in relation to flexibility, efficiency and accuracy. For example, conventional systems are often rigid and inflexible in providing static tutorials to client devices. In particular, conventional systems often generate a library of pre-crafted workflow tutorials and then provide client devices with access to this library of tutorials. This approach, however, provides limited, rigid options for providing tutorials to client devices. Indeed, conventional systems provide client devices with homogeneous tutorials that are rigidly crafted and not tailored to particular client devices, needs, or circumstances.

In addition, conventional systems are often inefficient because they waste system resources in providing lengthy, generalized tutorials. For example, as a result of the rigidity just discussed, conventional systems often rely on workflow tutorials that address several different editing techniques to transform a digital image. Unfortunately, this approach leads to client devices downloading and providing lengthy, time-consuming digital content that covers an array of topics or tools, even though only a portion is applicable to the needs of any particular client device. Accordingly, conventional systems often waste resources in storing and playing digital tutorials that include unnecessary or irrelevant digital content.

In addition to these technical problems in relation to flexibility and efficiency, conventional systems are often inaccurate. For example, as discussed above, conventional systems typically provide general workflow tutorials that include multiple steps and actions to illustrate a variety of different modifications to digital images. This often results in client devices providing inaccurate digital content that fails to address the particular features needed or desired by particular users/client devices. For example, if a given editing tool includes five different features or functions, conventional systems often provide a workflow tutorial that utilizes a single feature of the editing tool as part of a workflow for modifying a digital image (while ignoring the remaining features). This results in client devices receiving inaccurate digital content that fails to illustrate diversified features of particular editing tools or accurately identify those features desired by individual client devices. This approach further exacerbates the wasted resources discussed above (as client devices search for and play inaccurate tutorials) and often leads client devices to navigate away from conventional systems to alternate digital content sources.

The smart tutorial system provides many advantages and benefits relative to conventional systems and methods. For example, the smart tutorial system improves flexibility by generating and providing animated tutorials that showcase a variety of features and attributes of a particular editing tool. In contrast to conventional systems that provide general, pre-crafted, workflow based tutorials, the smart tutorial system can flexibly generate and provide different animated tutorials that showcase a range of different features and functionalities for a specific image editing tool targeted by a client device. Moreover, by utilizing a diversified clustering technique incorporating aesthetics gains, the smart tutorial system flexibly provides a set of animated tutorials that include not only animated tutorials that result in the highest quality images, but also animated tutorials that illustrate the full range of features, attributes, and uses for targeted editing tools.

In addition to improving flexibility, the smart tutorial system can also improve efficiency in utilizing system resources relative to conventional systems. As discussed above, the smart tutorial system can generate and provide dynamic animated tutorials that include steps specific to a particular editing tool requested by a client device. Accordingly, the smart tutorial system can generate animated tutorials are succinct and focused particular targeted editing tools. Accordingly, the smart tutorial system can avoid computer resources wasted in storing and playing lengthy, general workflow tutorials that include superfluous content irrelevant to targeted editing tools requested by particular client devices.

Moreover, the smart tutorial system can improve conventional systems by accurately providing animated tutorials that are specific to the particular needs of a user/client device. For example, rather than providing access to a repository of general tutorials, the smart tutorial system dynamically generates an ordered set of animated tutorials that are directly targeted to different features and functionalities for a targeted editing tool utilized by a client device. Thus, the smart tutorial system can provide a list of animated tutorials that illustrate a range of relevant features for a relevant image editing tool. This approach further reduces computer resources (inasmuch as client devices can avoid searching for and playing irrelevant tutorials from a repository of general tutorials) and allows client devices to remain within a digital image editing application to view relevant tutorial content.

As illustrated by the foregoing discussion, the present disclosure utilizes a variety of terms to describe features and advantages of the smart tutorial system. For example, as used herein, the term "digital image" refers to a digital visual representation (e.g., digital symbol, picture, icon, or illustration). For example, the term "digital image" includes digital files with the following file extensions: JPG, TIFF, BMP, PNG, RAW, or PDF. A digital image can include a part or portion of other digital visual media. For instance, a digital image include can include one or more frames of a digital video. Accordingly, digital images can also include digital files with the following file extensions: FLV, GIF, MOV, QT, AVI, WMV, MP4, MPG, MPEG, or M4V. Indeed, although many example embodiments are described in relation to digital images, the smart tutorial system can also generate animated tutorials in relation to digital video editing.

In addition, as used herein, the term "image editing tool" (or "editing tool") refers to an interactive feature of a digital content editing application. In particular, an image editing tool can include an interactive element for altering one or more parameters, aspects, features, or characteristics of a digital image. To illustrate, editing tools can include, but are not limited to, a crop tool, a blur tool, a sharpen tool, a color change tool, and a lighten tool.

As used herein, the term "animated tutorial" (or "tutorial") refers to a visual representation of one or more actions within a digital image editing application. In particular, an animated tutorial can include an animation of one or more actions (e.g., parameter modifications) within a digital image editing application to modify a digital image. For example, an animated tutorial can include a step-by-step portrayal of a sequence of modifications to user interface elements corresponding to parameters of a digital image editing application to generate a modified digital image from an initial digital image.

Relatedly, the term "parameter" refers to an edit setting or digital image property within a digital image editing application. For example, a parameter can include an attribute or characteristic associated with a digital image within a digital image editing application. In some embodiments, a parameter can include a digital image property listed within a metadata file such as an Extensible Metadata Platform ("XMP") file. Such parameters include, but are not limited to color, brightness, opacity, saturation, hue, and/or parameters associated with specific editing tools such as a color graph, a lasso tool, a draw tool, a fill tool, or a crop tool.

In one or more embodiments, the smart tutorial system trains and utilizes one or more machine learning models for various purposes. For example, the smart tutorial system may train and utilize a machine learning model to determine the aesthetic score associated with a particular animated tutorial. As used herein, the term "machine learning model" refers to a computational model that can be tuned (e.g., trained) based on inputs to approximate unknown functions (e.g., a neural network model, reinforcement learning model, regression learning model, or decision tree model). In some embodiments, a machine learning model can employ supervised learning approach utilizing a training data set generated by the smart tutorial system.

As used herein a "neural network model" (or "neural network") refers to a machine learning model that utilizes interconnected artificial neurons (or layers) that communicate and learn to approximate complex functions and generate outputs based on a plurality of inputs provided to the model. In particular, a neural network model includes a computer-implemented algorithm that implements deep learning techniques to analyze inputs (e.g., training input encoded as a machine learning model input vector) to make predictions and that improves in accuracy by comparing generated predictions against ground truth data (e.g., ground truth aesthetic scores) and modifying internal parameters for subsequent predictions. Examples of neural network models include convolutional neural networks, deep convolutional neural networks, generative adversarial neural networks, and recurrent neural networks (e.g., an LSTM).

Relatedly, the term "train" refers to utilizing information to tune or teach a machine learning model. The term "training" (used as an adjective or descriptor, such as "training data set") refers to information or data utilized to tune or teach the machine learning model.

Additionally, as used herein "aesthetic gain" refers to a measure of improved appearance. In particular, an aesthetic gain includes an increase in aesthetic value that occurs relative to a digital image after a one or more digital edits are applied to the digital image. For example, the smart tutorial system can determine an aesthetic gain for a digital image based on a comparison of an aesthetic score associated with the digital image prior to application of one or more digital edit and an aesthetic score associated with the digital image after application of one or more digital edits.

Additional detail regarding the smart tutorial system will now be provided with reference to the figures. For example, FIG. 1 illustrates a schematic diagram of an example system environment 100 for implementing a smart tutorial system 102 in accordance with one or more embodiments. Thereafter, a more detailed description of the components and processes of the smart tutorial system 102 is provided in relation to the subsequent figures.

As shown in FIG. 1, the environment 100 includes server(s) 106, a client computing device 112, and a network 110. Each of the components of the environment 100 can communicate via the network 110, and the network 110 may be any suitable network over which computing devices can communicate. Example networks are discussed in more detail below in relation to FIG. 8.

As mentioned, the environment 100 includes the client computing device 112. The client computing device 112 can be one of a variety of computing devices, including a smartphone, tablet, smart television, desktop computer, laptop computer, virtual reality device, augmented reality device, or other computing device as described in relation to FIG. 8. Although FIG. 1 illustrates a single client computing device 112, in some embodiments the environment 100 can include multiple different client computing devices, each associated with a different user. The client computing device 112 can further communicate with the server device 106 via the network 110. For example, the client computing device 112 can receive user input (e.g., a selection of a help button associated with an image editing tool) and provide the information pertaining to user input to the server device 106.

In one or more embodiments, the client computing device 112 includes a digital content editing system application 114. In particular, the digital content editing system application 114 may be a web application, a native application installed on the client computing device 112 (e.g., a mobile application, a desktop application, etc.), or a cloud-based application where part of the functionality is performed by the server device 106. The digital content editing system application 114 can modify or revise digital images via the computing device 112 (e.g., digital images stored on or accessed by the computing device 112). The digital content editing system application 114 can also present or display information to a user, including an ordered listing of dynamic animated tutorials generated by the smart tutorial system 102.

As illustrated in FIG. 1, the environment 100 includes the server device 106. The server device 106 may include one or more individual servers that may generate, store, receive, and transmit electronic data. For example, the server device 106 may receive data from the client computing device 112 in the form of a user input such as a selection related to an image editing tool. In addition, the server device 106 can transmit data to the client computing device 112 such as one or more dynamic animated tutorials. Furthermore, the server device 106 can include one or more machine learning models. In some embodiments, the server device 106 comprises a content server. The server device 106 can also comprise an application server, a communication server, a web-hosting server, a social networking server, or a digital content analytics server.

As shown in FIG. 1, the server device 106 can also include the smart tutorial system 102 as part of a digital content editing system 104. The digital content editing system 104 can communicate with the client computing device 112 to generate, modify, store, and transmit digital content. For example, the digital content editing system 104 can capture, store, manage, and edit digital images (and receive user inputs comprising an intent to modify the digital images). Similarly, the digital content editing system 104 can gather, manage, and analyze digital data collected from a variety of client computing devices. Additionally, in one or more embodiments, the smart tutorial system 102 and/or the digital content editing system 104 can access the database 108. For example, the database 108 can include a repository of existing animated tutorials utilized by the smart tutorial system 102 in generating dynamic animated tutorials.

Although FIG. 1 depicts the smart tutorial system 102 located on the server device 106, in some embodiments, the smart tutorial system 102 may be implemented by (e.g., located entirely or in part) on one or more other components of the environment 100. For example, the smart tutorial system 102 may be implemented by the client computing device 112 and/or a third-party device.

In some embodiments, although not illustrated in FIG. 1, the environment 100 may have a different arrangement of components and/or may have a different number or set of components altogether. For example, the client computing device 112 may communicate directly with the smart tutorial system 102, bypassing the network 110. The smart tutorial system 102 can be implemented in a variety of different ways across the server device 106, the network 110, and the client computing device 112. Additional detail regarding implementing different components of the smart tutorial system 102 across devices is provided below.

Figure 2:
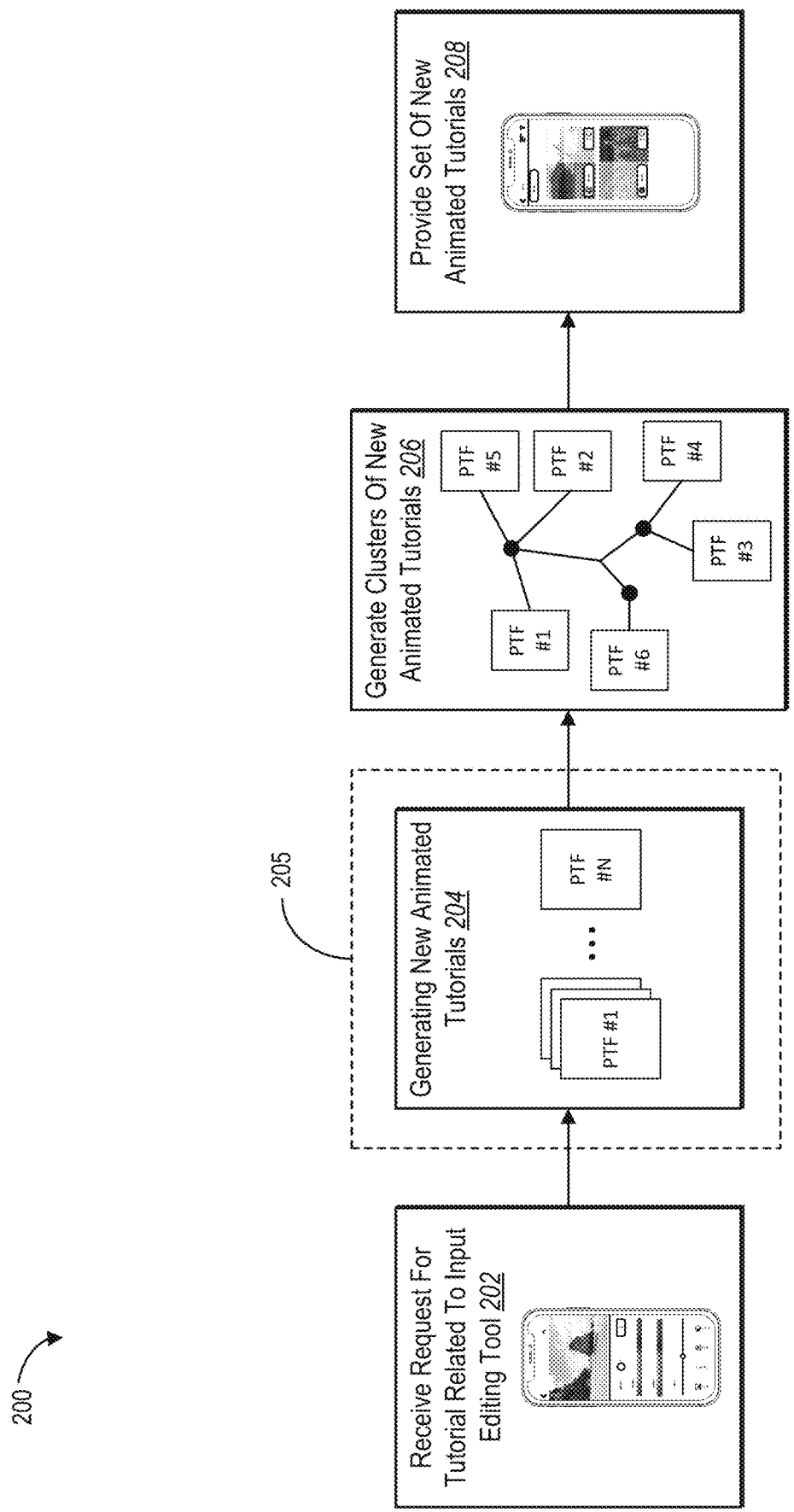
FIG. 2 illustrates a flowchart of generating and providing tool-based animated tutorials in accordance with one or more embodiments.

As discussed above, the smart tutorial system 102 can generate and provide dynamic animated tutorials that are specific to an image editing tool. FIG. 2 illustrates an overview of generating a diverse set of dynamic animated tutorials in accordance with one or more embodiments. Specifically, FIG. 2 illustrates the smart tutorial system 102 performing a series of acts 202-206 in generating and providing a set of animated tutorials to a client device.

For example, as illustrated in FIG. 2, the smart tutorial system 102 performs an act 202 of receiving a request for an animated tutorial related to an image editing tool. For instance, the smart tutorial system 102 can receive the request from a client computing device in response to a user selecting a help button. Additionally or alternatively, the smart tutorial system 102 can receive the request from a client computing device in response to a detected initiation or opening of a digital content editing system application (e.g., the digital content editing system application 114 on the client computing device 112).

In some embodiments, the smart tutorial system 102 perform the act 202 by receiving a search request for animated tutorials. For example, the smart tutorial system 102 can provide a user interface that includes search interface elements. Based on user input with the search interface elements (e.g., user input of a search query that includes an image editing tool), the smart tutorial system 102 can receive a request for an animated tutorial related to an image editing tool.

In some embodiments, the smart tutorial system 102 can perform the act 202 as part of providing other tutorials for display. For example, the smart tutorial system 102 can detect that a user is watching an existing animated tutorial that includes a particular editing tool. The smart tutorial system 102 can receive a request to provide additional example tutorials corresponding to the particular editing tool based on the user viewing the existing animated tutorial.

As further illustrated in FIG. 2, the smart tutorial system 102 can also perform an act 204 of generating new animated tutorials. For example, as will be discussed in greater detail below (e.g., in relation to FIGS. 3A, 4A), the smart tutorial system 102 can generate new animated tutorials by extracting steps from existing animated tutorials and compiling those steps into dynamic animated tutorials that are specifically directed to the image editing tool. In at least one embodiment, the smart tutorial system 102 compiles the steps into a format that is readable by a variety of digital content editing system applications (e.g., ADOBE PHOTOSHOP and ADOBE ILLUSTRATOR).

Additionally, the smart tutorial system 102 can perform a step 206 of generating clusters of the generated animated tutorials. For example, as mentioned above, in order to provide a diverse set of animated tutorial to the client computing device, the smart tutorial system 102 can utilize a clustering technique to group the generated animated tutorials. In one or more embodiments, the smart tutorial system 102 places an animated tutorial into a cluster by generating feature vectors for the animated tutorials based on normalized parameter values (e.g., normalized slider/control values) associated with the image editing tool. The smart tutorial system can then apply a K-Means clustering technique to the feature vectors of the animated tutorials to group the animated tutorials into clusters. This process is discussed in greater detail below (e.g., in relation to FIG. 4B).

The smart tutorial system 102 can also perform an act 208 of providing a set of new animated tutorials to the client computing device. For example, in at least one embodiment, the smart tutorial system 102 selects the set of animated tutorials by identifying a top ranking animated tutorial from each cluster generated in step 206. For instance, smart tutorial system 102 can determine aesthetics gains (e.g., aesthetics improvement scores) for the animated tutorials in each cluster. The smart tutorial system 102 can select animated tutorials from the clusters based on the aesthetics gains (e.g., by selecting the animated tutorial from each cluster with the highest aesthetics gain). In this manner, the smart tutorial system 102 can select diverse animated tutorials that are most likely to improve the aesthetics of corresponding digital images.

Figure 3A:
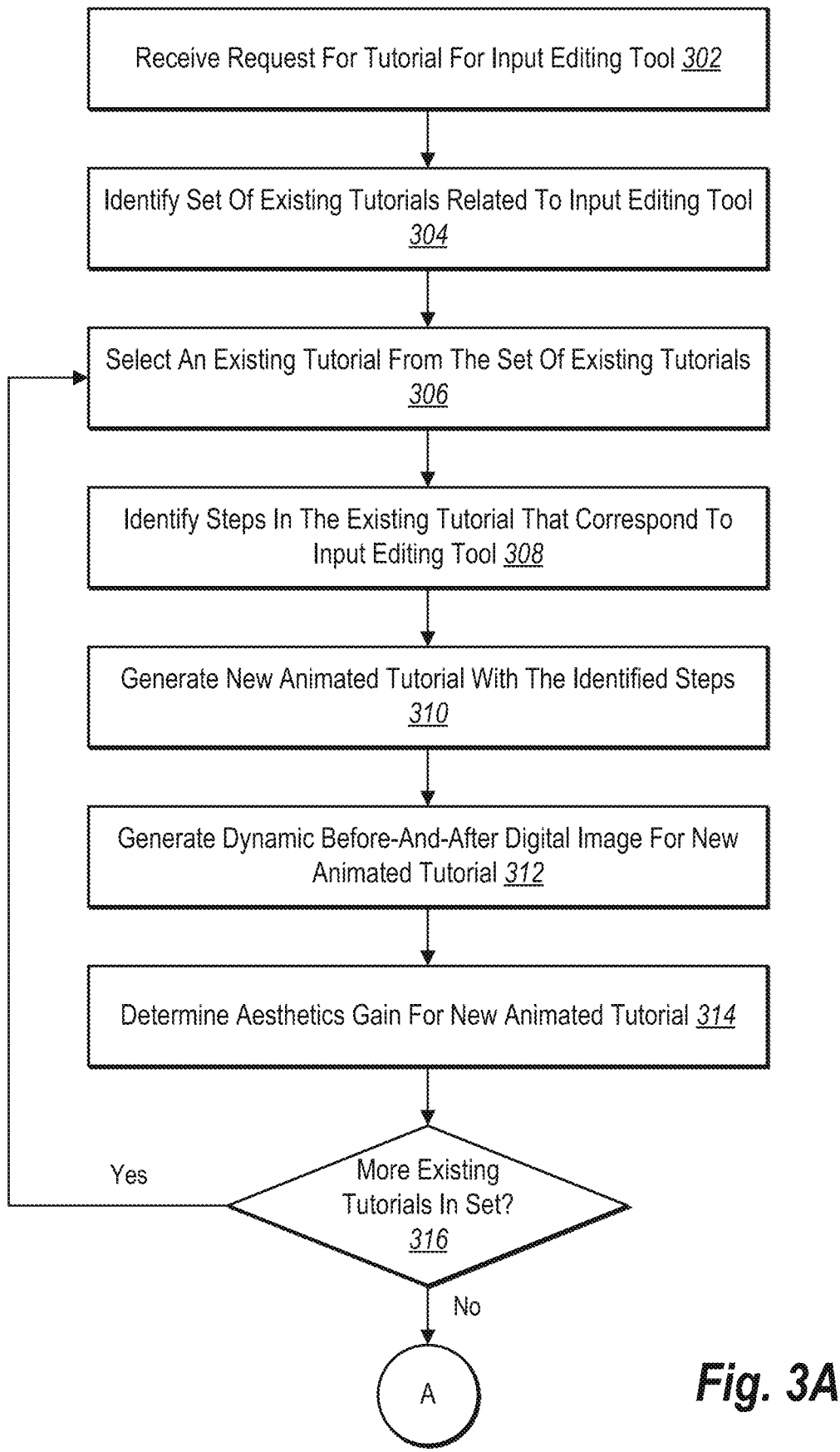
FIG. 3A illustrates a sequence diagram of generating tool-based animated tutorials in accordance with one or more embodiments.
Figure 3B:
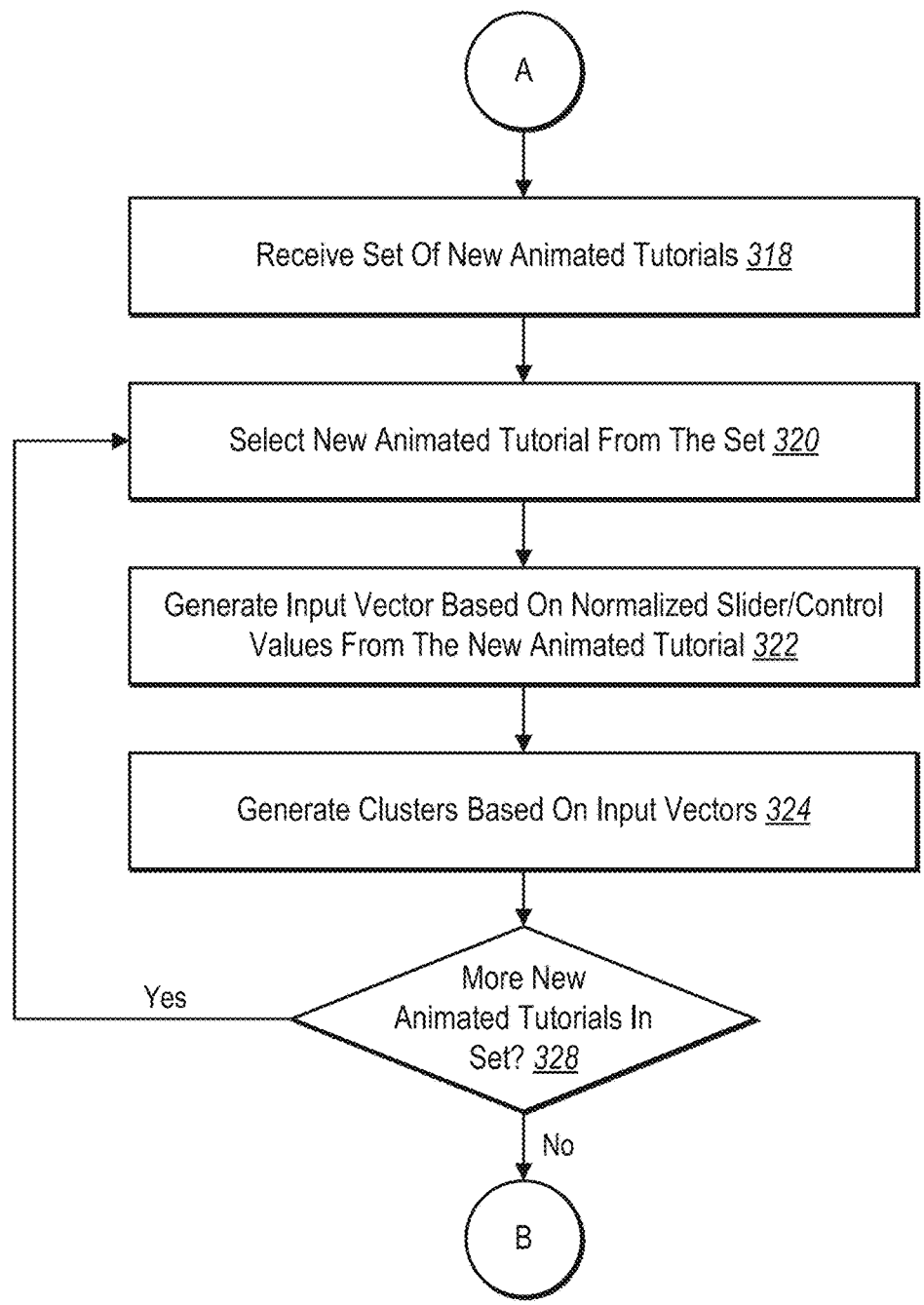
FIG. 3B illustrates a sequence diagram of generating clusters of animated tutorials in accordance with one or more embodiments.
Figure 3C:
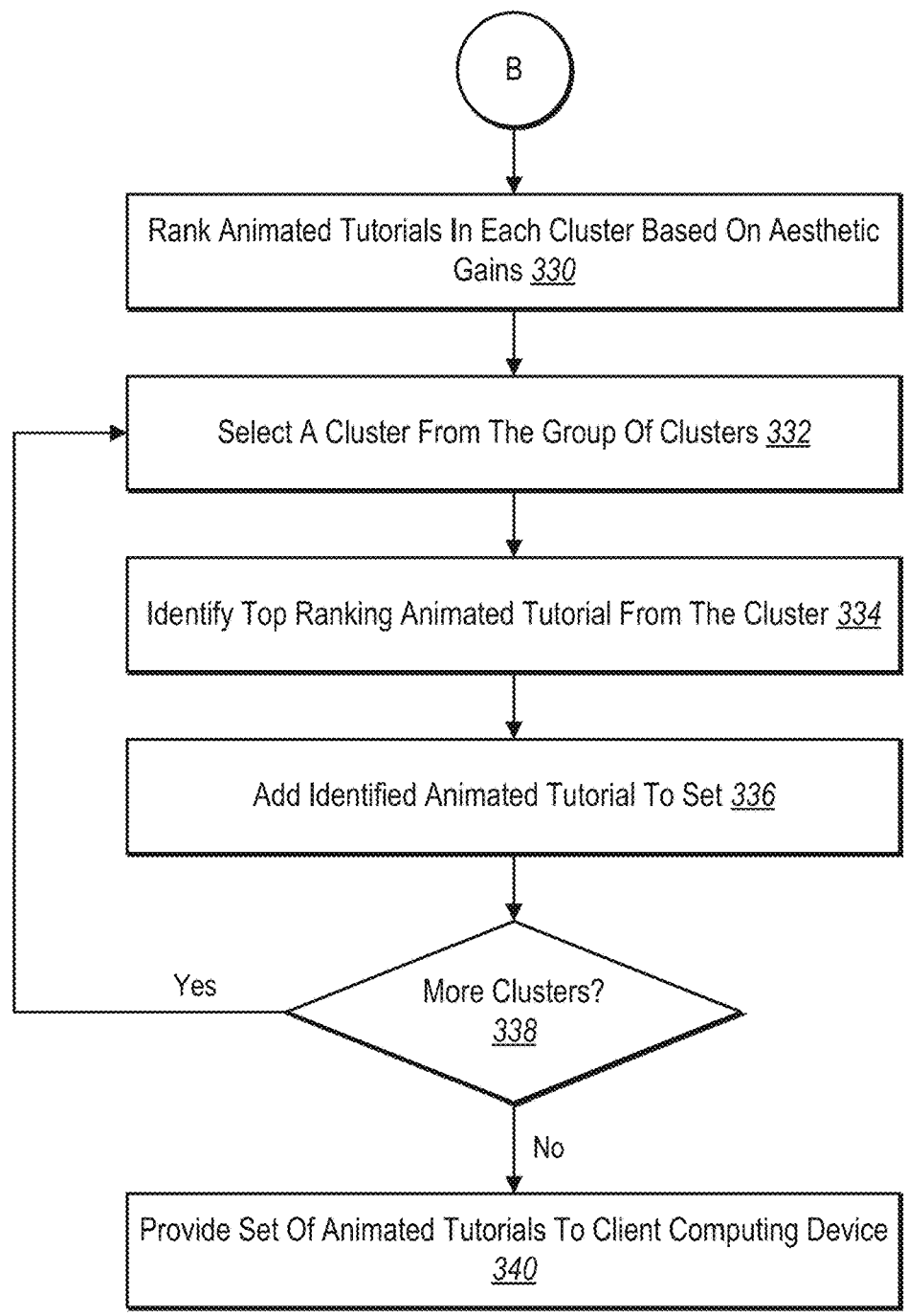
FIG. 3C illustrates a sequence diagram of providing a set of animated tutorials based on generated clusters in accordance with one or more embodiments.

Turning now to FIGS. 3A-3C, these figures illustrate sequence diagrams with additional detail regarding generating animated tutorials for a client computing device in accordance with one or more embodiments. For example, FIG. 3A illustrates a sequence diagram of acts performed by the smart tutorial system 102 in generating new animated tutorials. In one or more embodiments, the smart tutorial system 102 performs an act 302 of receiving a request for an animated tutorial corresponding to an image editing tool. As mentioned above, the smart tutorial system 102 can receive the request from a client computing device in a variety of circumstances, such as, in response to a detected selection of a help button and/or in response to a detected selection of the image editing tool.

In response to receiving the request for one or more animated tutorials corresponding to the image editing tool, the smart tutorial system 102 can perform an act 304 of identifying a set of existing tutorials related to the image editing tool. In addition, the smart tutorial system 102 also performs an act 306 of selecting an existing tutorial from the set of existing tutorials. For example, if the current iteration is the first iteration, the smart tutorial system 102 can select a first existing tutorial from the set of existing tutorials. If the current iteration is a subsequent iteration, the smart tutorial system 102 can select a next existing tutorial from the set of existing tutorials.

The smart tutorial system 102 can then perform an act 308 of identifying steps in the selected existing tutorial that correspond to the image editing tool. As discussed above, an existing tutorial may have many steps directed to a variety of editing tools. Accordingly, the smart tutorial system 102 can identify and extract steps within the existing tutorial that correspond to the image editing tool. For instance, the smart tutorial system 102 can identify steps that correspond to an image editing tool by analyzing metadata associated with the existing tutorial. In some embodiments, the smart tutorial system 102 can identify steps corresponding to an image editing tool by utilizing optical character recognition to analyze images of an animated tutorial and determine that a particular tool is being selected or otherwise utilized.

As illustrated in FIG. 3A, the smart tutorial system 102 can perform an act 310 of generating a new animated tutorial based on the extracted steps from the existing tutorial. For example, in one or more embodiments, the smart tutorial system 102 can generate the new animated tutorial by compiling the extracted steps into a predetermined format. To illustrate, and as will be discussed further below (e.g., in relation to FIG. 4A), the smart tutorial system 102 can compile the extracted steps into a Portable Tutorial Format ("PTF") that is compatible with different digital content editing applications (e.g., the digital content editing system application 114) regardless of the type of client computing device that implements the digital content editing applications.

In one or more embodiments, the smart tutorial system 102 further generates the new animated tutorial by performing an act 312 of generating a dynamic before-and-after digital image for the new animated tutorial. As mentioned above, the smart tutorial system 102 can display the dynamic before-and-after digital image associated with an animated tutorial to demonstrate how a digital image changes by applying the steps illustrated by the animated tutorial. Accordingly, the smart tutorial system 102 can generate the before-and-after digital image for the new animated tutorial by identifying the digital image upon which the image editing tool is being applied in the steps of the animated tutorial. Furthermore, the smart tutorial system 102 can extract a first copy of the digital image from the animated tutorial from a step immediately prior to application of the image editing tool, and a second copy of the digital image from the animated tutorial from a step immediately following application of the image editing tool. In at least one embodiment, the smart tutorial system 102 generates the dynamic before-and-after digital image by stitching the first and second copies of the digital image into a single image.

In some embodiments, rather than extracting first and second copies of a digital image from an animated tutorial, the smart tutorial system 102 can generate the first and second copies. For instance, the smart tutorial system 102 can identify a first set of parameters of a digital image before application of an editing tool and identify a second set of parameters of the digital image after application of the editing tool. The smart tutorial system 102 can apply the first set of parameters to generate the first copy of the digital image and apply the second set of parameters to generate the second copy of the digital image.

As shown in FIG. 3A, the smart tutorial system 102 also performs an act 314 of determining an aesthetics gain associated with the new animated tutorial. For example, in one or more embodiments, the smart tutorial system 102 determines the aesthetics gain associated with the new animated tutorial based on the first and second copy of the digital image identified at the act 312. As will be discussed in greater detail below (e.g., in relation to FIG. 4C), the smart tutorial system 102 can utilize the first and second copy of the digital image as inputs into an image aesthetics predictor computing model trained with ground truth digital image aesthetics training data. In at least one embodiment, the image aesthetics predictor computing model outputs an aesthetics score. The smart tutorial system 102 can associate the aesthetics score with the animated tutorial for later use.

In one or more embodiments, as shown in FIG. 3A, after generating the new animated tutorial, the smart tutorial system 102 can determine if there are any remaining existing tutorials in the set of existing tutorials (e.g., from the act 304). If there are additional remaining existing tutorials (e.g., "Yes"), the smart tutorial system 102 can repeat the acts 306-314. If there are no remaining existing tutorials (e.g., "No"), the smart tutorial system 102 can generate clusters of the generated animated tutorials.

FIG. 3B illustrates a sequence diagram of steps performed by the smart tutorial system 102 in clustering newly generated animated tutorials. For example, as shown in FIG. 3B, the smart tutorial system 102 performs an act 318 of receiving a set of new animated tutorials (e.g., the set of new animated tutorials generated by the acts illustrated in FIG. 3A). The smart tutorial system 102 can perform the act 320 of selecting a new animated tutorial from the set.

As shown in FIG. 3B, the smart tutorial system 102 can perform an act 322 of generating an input vector associated with the animated tutorial. For example, in one or more embodiments, the smart tutorial system 102 generates the input vector based on parameters corresponding to the image editing tool. For instance, the smart tutorial system 102 can generate a feature vector reflecting normalized slider/control values associated with the image editing tool within the animated tutorial. To illustrate, the smart tutorial system 102 can analyze a final step in the animated tutorial to identify slider/control values illustrated in that step. The smart tutorial system 102 can then generate an input vector based on the identified slider/control values.

As shown in FIG. 3B, the smart tutorial system 102 can perform an act 324 of generating clusters based on the input vectors. In one or more embodiments, the smart tutorial system 102 provides the generated vector to a clustering algorithm, system, or model. For example, the smart tutorial system 102 can provide the generated vector to a clustering model, such as a K-Means clustering model. To illustrate, a K-means clustering model can analyze the input vectors and determine a distance between the input vectors. In some embodiments, the smart tutorial system 102 utilizes a K-means clustering model that analyzes a normalized Manhattan-Distance as a distance metric to generate clusters. In one or more embodiments, the distance metric represents a degree of dissimilarity among the generated animated tutorials.

To illustrate, the smart tutorial system 102 can generate at least one cluster based on the generated input vector and the normalized distance metric. For example, in at least one embodiment, the smart tutorial system 102 can add the new animated tutorial to a cluster with other animated tutorials based on distances between the new animated tutorial and other animated tutorials in the cluster.

After adding the new animated tutorial to an appropriate cluster, the smart tutorial system 102 can perform an act 328 of determining whether there are additional animated tutorials in the received set of animated tutorials that still need to be clustered. If there are (e.g., "Yes"), the smart tutorial system 102 can perform the acts 320-326 again. If there are not (e.g., "No"), the smart tutorial system 102 can build and provide a subset of the clustered animated tutorials to the client computing device for display.

FIG. 3C illustrates a sequence diagram of acts performed by the smart tutorial system 102 in generating a set of animated tutorials corresponding to the image editing tool for the client computing device in accordance with one or more embodiments. As shown in FIG. 3C, the smart tutorial system 102 performs an act 330 of ranking the animated tutorials in each cluster based on aesthetic gains. For example, as discussed above, the smart tutorial system 102 can determine an aesthetic gain for each animated tutorial. Accordingly, the smart tutorial system 102 can rank the animated tutorials in each of the generated clusters such that the animated tutorial with the highest aesthetic gain is ranked highest and the animated tutorial with the lowest aesthetic gain is ranked lowest.

Next, the smart tutorial system 102 performs an act 332 of selecting a cluster from the group of generated clusters. With the selected cluster, the smart tutorial system 102 can perform an act 334 of identifying the top ranking animated tutorial from the selected cluster. As discussed above, the smart tutorial system 102 can identify the animated tutorial in the selected cluster with the top aesthetics score. The smart tutorial system 102 can then perform an act 336 of adding the identified animated tutorial to the set of animated tutorials to provide to the client computing device.

As shown in FIG. 3C, the smart tutorial system 102 also performs an act 338 of determining whether there are more clusters in the group of clusters from which an animated tutorial has not been selected. If there are more clusters (e.g., "Yes"), the smart tutorial system can repeat the steps 332-336. If there are no more clusters (e.g., "No"), the smart tutorial system 102 can perform the step 340 of providing the set of animated tutorials to the client computing device (e.g., the client computing device 112).

FIGS. 3A-3C illustrate the smart tutorial system 102 providing a set of generated animated tutorials to a client computing device in accordance with one or more embodiments. Although FIGS. 3A-3C illustrate acts being performed in a particular order or arrangement, the smart tutorial system 102 can perform the acts in a variety of different orders (and with greater or fewer acts than illustrated). For example, although FIG. 3A illustrates generating dynamic before-and-after digital images at the act 312 and determine aesthetics gains at the act 314 in a particular arrangement within a sequence, the smart tutorial system 102 can generate dynamic before-and-after digital images and/or determine aesthetics gains in a variety of different times or places within the sequence of acts illustrated in FIGS. 3A-3C.

Similarly, although the act 322 is described in relation to an input vector that reflects a particular parameter (or slider control value), the smart tutorial system 102 can generate an input vector reflecting a different metric. For example, in some embodiments, the smart tutorial system 102 can perform the act 322 of generating an input vector associated with an animated tutorial based on a difference in slide/ control values between a first step in the animated tutorial and a last step in the animated tutorial.

Additionally, although the description above describes the smart tutorial system 102 performing the act 324 of generating clusters utilizing K-Means clustering, the smart tutorial system 102 can utilize a variety of clustering algorithms. For example, the smart tutorial system 102 can perform the act 324 of generating clusters based on the input vectors utilizing mean-shift clustering that forms clusters by iteratively identifying centroids within dense areas of data points. Alternatively, the smart tutorial system 102 can perform the act 324 of generating clusters by utilizing expectation-maximization clustering.

Furthermore, the smart tutorial system 102 can perform the act 324 of generating clusters based on other parameters and/or other feature vectors. For example, the smart tutorial system 102 can perform the act 324 of generating clusters based on a magnitude of change in slider/control values between first steps of the animated tutorials and last steps of the animated tutorials. In yet further embodiments, the smart tutorial system 102 can cluster animated tutorials based on other features besides slider/control values (e.g., based on number of steps in the animated tutorials).

Moreover, the smart tutorial system 102 can perform the act 332 of selecting a cluster from a group of generated clusters in other ways. For example, the smart tutorial system 102 can perform the act 332 of selecting clusters by identifying the animated tutorials with aesthetics scores above a predetermined threshold score (e.g., above a threshold aesthetics gain). In other embodiments, the smart tutorial system 102 can perform the act 332 of selecting clusters by identifying a threshold number of animated tutorials from the generated clusters with aesthetics scores above the predetermined threshold score.

Figure 4A:
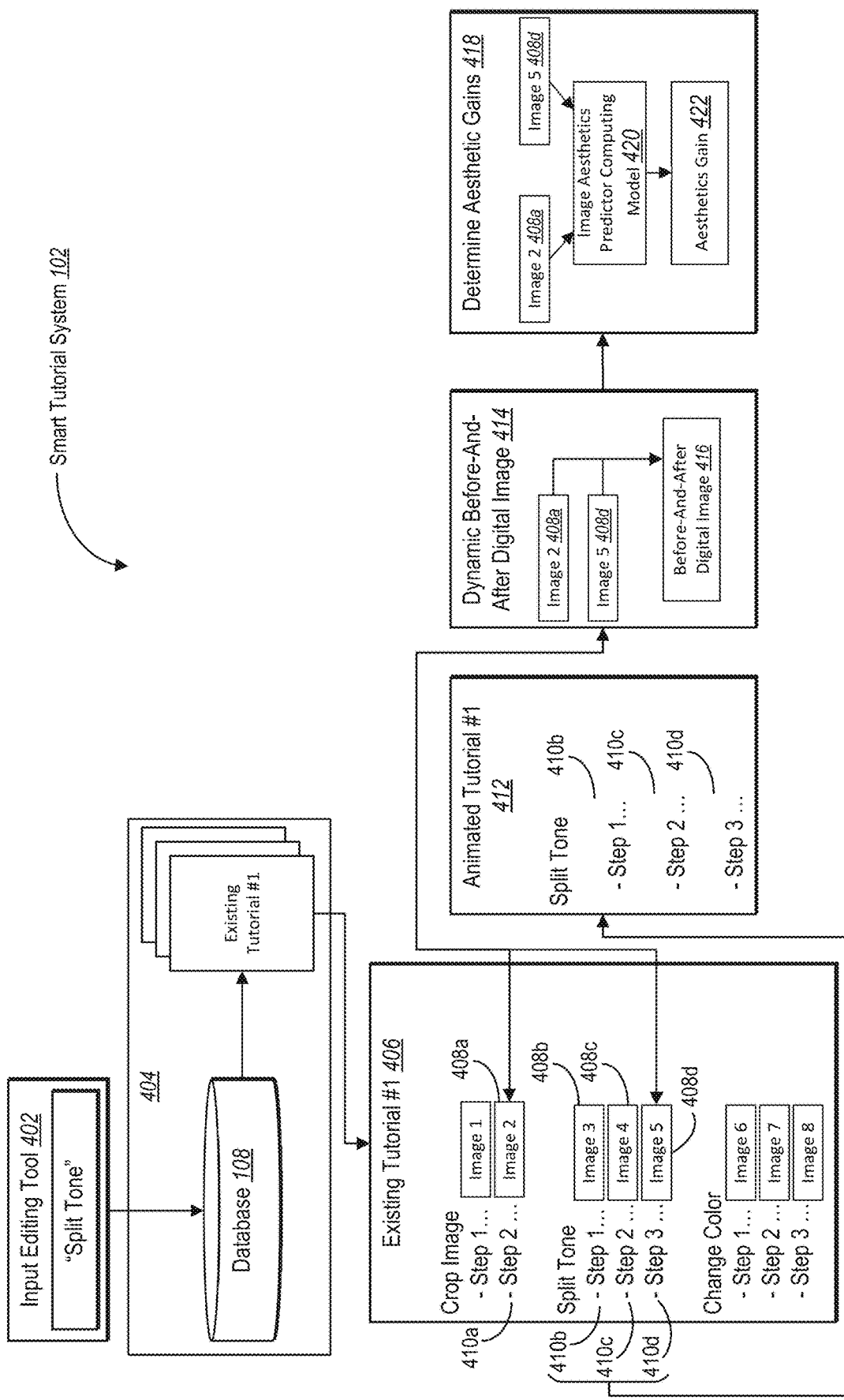
FIG. 4A illustrates a diagram of generating a tool-based animated tutorial with a before-and-after digital image in accordance with one or more embodiments.
Figure 4B:
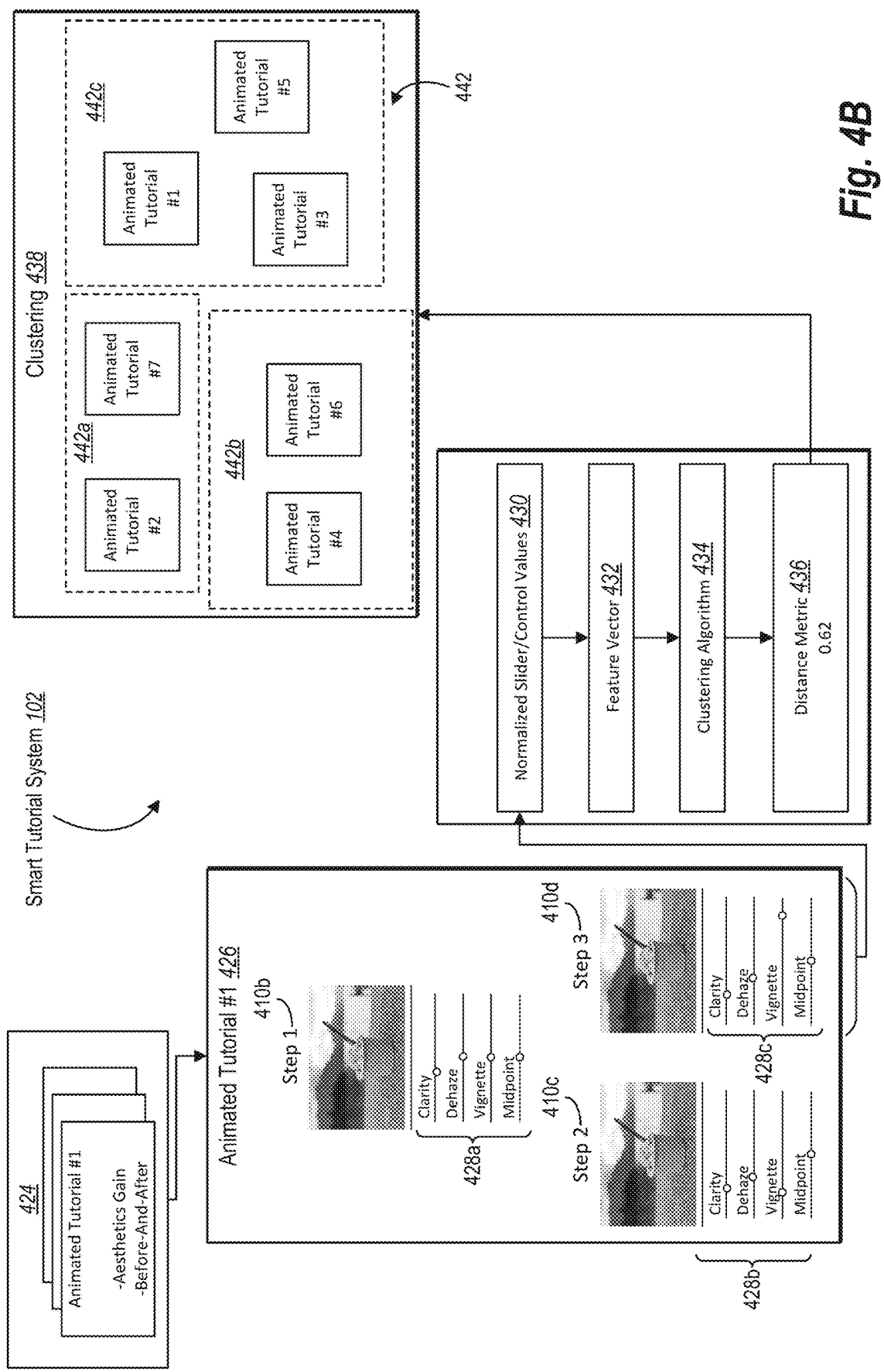
FIG. 4B illustrates a diagram of adding an animated tutorial to a cluster in accordance with one or more embodiments.

Turning now to FIGS. 4A-4C, additional detail will be provided with regard to generating, clustering, and providing animated tutorials. For example, FIG. 4A illustrates the smart tutorial system 102 generating animated tutorials in response to receiving a request for animated tutorials specific to an image editing tool in accordance with one or more embodiments. As illustrated in FIG. 4A, the smart tutorial system 102 performs an act 402 of receiving a request for one or more animated tutorials corresponding to a target image editing tool (e.g., "split tone"). For instance, the smart tutorial system 102 can receive the request for animated tutorials corresponding to the split tone editing tool in response to a detected user selection of a help button within a user interface with slider/control elements directed to the split tone editing tool.

In response to receiving the request for animated tutorials corresponding to the image editing tool, the smart tutorial system 102 can perform an act 404 of querying the database 108 for existing animated tutorials corresponding to the image editing tool. For example, the smart tutorial system 102 can query the database 108 for existing animated tutorials that have at least one step associated with the image editing tool. The smart tutorial system 102 may query the database 108 by analyzing: existing animated tutorial general titles, existing animated tutorial step titles, existing animated tutorial metadata, existing animated tutorial images, or any information associated with the existing animated tutorials within the database 108.

In at least one embodiment, the smart tutorial system 102 can generate and store a map based on the analysis of the existing tutorials in the database 108. For example, for each existing animated tutorial, the smart tutorial system 102 can add map entries where each map entry includes a step name as a key and a pair of edit settings (e.g., camera raw parameters) with-and-without the step settings as the value associated with the key. To illustrate, in an existing tutorial including steps related to cropping, lighting adjustment, color mixer, and effects, the smart tutorial system 102 can generate the following map entries:

| | |
|---|---|
| "crop" | std::pair<cr params without crop, cr params with crop> |
| "lighting" | std::pair<cr params without lighting params, cr params with lighting params (exposure, shadow, highlights)> |
| "color mixer" | std::pair<cr params without color-mix params, cr params with color-mix params> |
| "effects" | std::pair<cr params without effects (dehaze, vignette) params, cr params with effects (dehaze, vignette) params> |

In at least one embodiment, the smart tutorial system 102 can generate the map including entries for the steps from the existing animated tutorials each time a new animated tutorial is added to the database 108. Alternatively, the smart tutorial system 102 can generate the map periodically every day, every week, etc. Additionally, the smart tutorial system 102 can store the map as part of the database 108, within the digital content editing system 104, or on the client computing device 112.

After identifying an existing animated tutorial that corresponds to the image editing tool, the smart tutorial system 102 can generate an animated tutorial based on the existing animated tutorial. For example, the smart tutorial system 102 can perform an act 406 of extracting the steps in the existing tutorial (e.g., "Existing Tutorial #1") that correspond to the image editing tool.

As mentioned above, existing animated tutorials typically have steps directed to a variety of editing tools. As shown in FIG. 4A, the identified existing tutorial #1 includes steps directed to the crop image editing tool, the split tone editing tool, and the change color editing tool—each tool with its own associated steps. The smart tutorial system 102 can parse the existing tutorial into its component steps and identify those steps that correspond to the image editing tool utilizing text analysis, image analysis, and/or metadata analysis. Additionally or alternatively, the smart tutorial system 102 can identify the steps that correspond to the image editing tool by identifying the key/value pair within the map described above that corresponds to the current existing tutorial (e.g., the "Existing Tutorial #1") and the image editing tool. For example, as show in FIG. 4A, the smart tutorial system 102 can determine that the steps 410b, 410c, and 410d correspond to the target image editing tool (e.g., "split tone").

Accordingly, the smart tutorial system 102 can perform an act 412 of generating the animated tutorial (e.g., the "Animated tutorial #1") based on the identified steps corresponding to the target image editing tool. For example, in at least one embodiment, the smart tutorial system 102 generates animated tutorials in a portable tutorial format ("PTF") that is compatible with various types of applications associated with the digital content editing system 104 (e.g., mobile applications, desktop applications, web applications). To generate a PTF animated tutorial based on the identified steps, the smart tutorial system 102 can identify the control values (e.g., the editing parameters) associated with each step in the identified steps. The smart tutorial system 102 can then identify a default PTF template associated with the digital content editing system application 114. In at least one embodiment, the smart tutorial system 102 then injects the identified control values into the identified default PTF template and removes any other unrelated steps from the template to generate the PTF animated tutorial.

To illustrate, the smart tutorial system 102 can generate the PTF animated tutorial to include indications of tools mapped to modified parameters for those tools. For example, the smart tutorial system 102 can generate the PTF animated tutorial to include code that causes a digital image editing system application to visually portray how to make edits to a digital image to match a modified digital image (e.g., the "after" image from the before-and-after digital image). The PTF animated tutorial can include code for visually presenting various information such as a title ("How to Use Split Tone"), a description of the PTF animated tutorial ("Learn how to create a dramatic image using Split Tone"), and names for the steps within the PTF animated tutorial. In addition, the PTF animated tutorial can include code for instructing and showing adjustments to slider/control parameters. In some embodiments, the smart tutorial system 102 generates the PTF animated tutorial to include text-based descriptions or explanations of modifications represented in each step. Thus, when a client computing device executes a PTF animated tutorial, the smart tutorial system 102 presents visual representations of how to modify a digital image along with text-based descriptions to guide a user through the modifications in a step-by-step, hands-on manner.

After generating the animated tutorial associated with the image editing tool, the smart tutorial system 102 can further perform an act 414 of generating a dynamic before-and-after digital image associated with the generated animated tutorial. For example, as discussed above, every step (e.g., the steps 410a-410d) of an existing animated tutorial identified in the database 108 can include a digital image (e.g., the digital images 408a, 408b, 408c, and 408d) that illustrates the result of that step. Accordingly, the smart tutorial system 102 can generate the image 408a based on the digital image associated with the step 410a from immediately prior to application of the image editing tool. The smart tutorial system 102 can further generate the image 408d based on the digital image associated with the step 410d from immediately after application of the image editing tool. Alternatively, rather than generating the dynamic before-and-after digital image based on images extracted from steps of the animated tutorial, the smart tutorial system 102 can generate the dynamic before-and-after digital image by identifying parameters that change as a result of the modifications in the animated tutorial (e.g., hue +0.60, saturation −0.2, luminance +0.46), and apply those parameters to the first image found in the animated tutorial to generate the "after" image.

With these "before" and "after" images, the smart tutorial system 102 can perform an act 416 of generating the dynamic before-and-after digital image. For example, in at least one embodiment, the smart tutorial system 102 can generates the dynamic before-and-after digital image by combining the image 408a and the image 408d into a single digital image. The effect of this operation is that the dynamic before-and-after digital image can appear like a single image with the image editing tool applied to one-half of the image.

As shown in FIG. 4A, the smart tutorial system 102 also performs an act 418 of determining an aesthetic gain associated with the generated animated tutorial. In one or more embodiments, the smart tutorial system 102 determines aesthetic gain associated with an animated tutorial utilizing an image aesthetics predictor computing model 420. For example, as shown in FIG. 4A, the smart tutorial system 102 can apply the image aesthetics predictor computing model 420 to the digital image 408a to determine a global aesthetics/quality score associated with the digital image 408a. The smart tutorial system 102 can then apply the image aesthetics predictor computing model 420 to the digital image 408d to determine a global aesthetics/quality score associated with the digital image 408d. In one or more embodiments, the global aesthetics/quality score represents the image quality associated with the input image. In at least one embodiment, the image aesthetics predictor computing model 420 can also output one or more aesthetics attributes values associated with the input image.

The smart tutorial system 102 can utilize a neural network for the image aesthetics predictor computing model 420. To illustrate, the image aesthetics predictor computing model 420 can include a convolutional neural network model that computes a global aesthetics/quality score in conjunction with ten aesthetics attribute values (e.g., interesting content, object emphasis, good lighting, etc.) for an input image.

As mentioned above, the smart tutorial system 102 utilizes the image aesthetics predictor computing model 420 to determine a global aesthetics/quality score for an input digital image. In one or more embodiments, the smart tutorial system 102 also trains the image aesthetics predictor computing model 420 utilizing ground truth digital image aesthetics training data. For example, the ground truth digital image aesthetics training data can include training images and corresponding training global aesthetics/quality scores. The smart tutorial system 102 can train the image aesthetics predictor computing model 420 (e.g., a convolutional neural network) by providing a ground truth digital image to the image aesthetics predictor computing model 420, and then comparing the output of the image aesthetics predictor computing model 420 against the corresponding training global aesthetics/quality score. The smart tutorial system 102 can then modify parameters of the image aesthetics predictor computing model 420 based on the comparison. The smart tutorial system 102 can repeat this process with additional ground truth digital image aesthetics training data until a measure of loss in the image aesthetics predictor computing model 420 is reduced.

Returning to FIG. 4A, in one or more embodiments, the smart tutorial system 102 can determine the aesthetics gain in an act 422. For example, the smart tutorial system 102 can determine the aesthetics gain utilizing the global aesthetics/quality scores for the digital image preceding application of the image editing tool (e.g., the digital image 408a) and the digital image following application of the image editing tool (e.g., the digital image 408d). For example, the smart tutorial system 102 can determine the aesthetics gain according to the following equation:

$$\text{Aesthetics Gain} = \frac{(\text{Aesthetics of After Image} - \text{Aesthetics of Before Image})}{\text{Aesthetics of Before Image}}$$

In one or more embodiments, the aesthetics gain may be a value out of 100, or a value in between zero and one (e.g., "0.88").

In additional or alternative embodiments, the smart tutorial system 102 can determine an aesthetics gain in different ways. For example, rather than utilizing the image aesthetics predictor computing model 420 to generate global aesthetics/quality scores for the images 408a, 408d, the smart tutorial system 102 can utilize a heuristics-based approach where attributes of the images 408a, 408d are assigned scores based on a comparison to visual ideals. For example, the smart tutorial system 102 can assign a low luminance score to the image 408a in response to determining that the luminance of the image 408a is low compared to a predetermined standard. The smart tutorial system 102 can further assign a high luminance score to the image 408d in response to determining that the luminance of the image 408d is similar to the predetermined standard. The smart tutorial system 102 can then determine the aesthetics gain between the images 408a, 408d based on a comparison of the two determined scores.

Although FIG. 4A illustrates a number of acts in a given order, the smart tutorial system 102 can accomplish the same outcomes illustrated in FIG. 4A in other ways. For example, the smart tutorial system 102 can generate a dynamic before-and-after digital image for an animated tutorial prior to generating the animated tutorial. In other embodiments, the smart tutorial system 102 can determine an aesthetics gain represented by a dynamic before-and-after digital image prior to generating the associated animated tutorial. Similarly, the smart tutorial system 102 can accomplish the same outcomes illustrated in FIG. 4A utilizing fewer or greater acts than those shown.

As mentioned above, after generating one or more animated tutorials associated with a target image editing tool, as shown in FIG. 4A, the smart tutorial system 102 can generate clusters of the generated animated tutorials to ultimately identify tutorials that illustrate particular features or functions of the target image editing tool. For example, FIG. 4B illustrates the smart tutorial system 102 generating clusters of animated tutorials in accordance with one or more embodiments. Indeed, as shown in FIG. 4B, the smart tutorial system 102 performs an act 424 of receiving one or more generated animated tutorials (e.g., animated tutorials generated in relation to FIG. 4A). In one or more embodiments, the smart tutorial system 102 can cluster animated tutorials utilizing a variety of clustering techniques. For instance, in at least one embodiment, the smart tutorial system 102 clusters animated tutorials utilizing K-Means clustering. For example, as shown in FIG. 4B, the smart tutorial system 102 clusters one of the generated animated tutorials utilizing K-Means clustering by identifying slider/control values 428a, 428b, 428c in each of the steps 410a, 410b, 410c, respectively. In additional or alternative embodiments, the smart tutorial system 102 can cluster the animated tutorials utilizing other clustering techniques and/or input vectors. For example, the smart tutorial system 102 can cluster the animated tutorials utilizing mean-shift clusters where each animated tutorial is positioned in a vector space based on its associated aesthetic gain.

In at least one embodiment, as shown in FIG. 4B, the smart tutorial system 102 can cluster the animated tutorial (e.g., the "Animated tutorial #1") based on the slider/control values 428c of the last step 410c of the animated tutorial. For example, the smart tutorial system 102 can perform the step 430 of normalizing the slider/control values 428c (e.g., the parameters associated with the animated tutorial). In one or more embodiments, the smart tutorial system 102 normalizes the slider/control values 428c by applying one or more functions to the slider/control values 428c to generate a normalized value. For example, in the last step 410d of the animated tutorial, the slider/control values 428c may be 0.2 for clarity, 0.45 for dehaze, 0.9 for vignette, and 0.5 for midpoint. Similarly, the smart tutorial system 102 can determine normalized values based on the parameters of the last step of the other animated tutorials received in the act 424. In alternative embodiments, the smart tutorial system 102 can generate the normalized value based on a magnitude of change between the parameters in the first step 410b of the animated tutorial and the parameters in the last step 410d of the animated tutorial.

As shown, the smart tutorial system 102 can perform an act 432 of generating a feature vector based on the normalized slider/control values. For example, the smart tutorial system 102 can generate the feature vector to include the normalized slider/control values and then perform an act 434 of applying a K-Means clustering algorithm to the generated feature vector. In one or more embodiments, the smart tutorial system 102 performs the step 436 of receiving a distance metric (e.g., a normalized Manhattan-Distance; "0.62") as an output from the K-Means clustering algorithm. For example, the smart tutorial system 102 can receive a distance metric ranging between zero and one for each of the animated tutorials received in the act 424. In other embodiments, the distance metric may be an integer or other type of metric.

In additional or alternative embodiments, the smart tutorial system can cluster based on other clustering techniques. For example, the smart tutorial system 102 can generate the feature vector to include normalized values based on the same or other parameters to use in connection with mean-shift clustering, expectation-maximization clustering, or any other suitable clustering technique.

Utilizing the received distance metric, the smart tutorial system 102 can perform the step 438 of clustering the animated tutorial (e.g., the "Animated tutorial #1"). For example, in one or more embodiments the smart tutorial system 102 can generate and maintain a plurality of clusters 442a-442c of animated tutorials. In at least one embodiment, the smart tutorial system 102 clusters an animated tutorial by adding a feature vector associated with the animated tutorial to a feature space, and then partitioning the feature space into a predetermined number of clusters such that the distance between animated tutorials in a cluster and the mean or center of that cluster is minimized. Each time the smart tutorial system 102 adds a new animated tutorial to the feature space, the smart tutorial system 102 can again partition the feature space into clusters. The smart tutorial system 102 can automatically determine the number of clusters, or the number of clusters can be user-specified. Thus, for example and as shown in FIG. 4B, the smart tutorial system 102 may cluster together animated tutorials #1 and #5 in one iteration, only to cluster the same animated tutorials differently in the next iteration.

In one or more embodiments, the number of clusters helps determine variety across the animated tutorials provided to the client computing device 112 and may be configured by a user of the client computing device 112. Alternatively, the smart tutorial system 102 may dynamically determine the number of clusters to maximize variety across the animated tutorial provided to the client computing device 112.

After clustering the generated animated tutorials, as shown in FIG. 4B, the smart tutorial system 102 can intelligently select diverse animated tutorials that showcase attributes and characteristics of the target image editing tool. FIG. 4C illustrates the smart tutorial system 102 generating a listing of animated tutorials to provide to the client computing device 112 in accordance with one or more embodiments. As illustrated in FIG. 4C, the smart tutorial system 102 performs an act 444 of receiving the generated clusters 442a-442c of animated tutorials. As discussed above, the generated clusters 442a-442c include animated tutorials grouped by similarity. As such, in order to provide a listing of animated tutorials that are diverse, the smart tutorial system 102 can select a single animated tutorial from each of the clusters 442a-442c.

For example, the smart tutorial system 102 can identify an animated tutorial from the cluster 440c by performing an act 446. In one or more embodiments, the smart tutorial system 102 identifies an animated tutorial in a cluster by ranking the animated tutorials in that cluster based on aesthetics gains and then selecting animated tutorials based on the ranking (e.g., selecting a top number of animated tutorials such as the top one, two, or three based on the ranking or selecting the animated tutorials that satisfy a threshold ranking or threshold aesthetic gain). To illustrate, in the act 446, the smart tutorial system 102 can rank the animated tutorials in the cluster 440c based on their aesthetics gains to determine that "Animated tutorial #3" has the highest aesthetics gain.

Accordingly, the smart tutorial system 102 can select "Animated tutorial #3 for inclusion in the set 452 of animated tutorials in the act 448. As shown, the smart tutorial system 102 performs the ranking and analysis described above for every cluster in order to generate the set 452. In one or more embodiments, the smart tutorial system 102 can further perform an act 450 of ordering the generated set 452 to create the ordered set 452'. In at least one embodiment, the smart tutorial system 102 orders the generated set 452 based on the aesthetics gains associated with each animated tutorial in the set 452. Thus, when displayed in order, the ordered set 452' includes the animated tutorial with the highest quality image transformation first.

Although the smart tutorial system 102 is described in FIGS. 4A-4C as generating and providing a set of animated tutorials in response to a received indication of a target image editing tool (e.g., in response to a user selection of a help button associated with the target image editing tool), the smart tutorial system 102 may generate sets of animated tutorials in response to other inputs. For example, the smart tutorial system 102 may generate a set of animated tutorials offline (e.g., prior to user selection of any particular target image editing tool). As such, the smart tutorial system 102 may store sets of animated tutorials directed to different image editing tools, and surface a relevant set to a client computing device in response to receiving an indication of a target image editing tool.

As discussed above, the smart tutorial system 102 can generate and provide animated tutorials corresponding to an image editing tool to a client computing device via a digital content editing system application. FIGS. 5A-5L illustrate the smart tutorial system 102 generating interactive user interfaces providing animated tutorials in accordance with one or more embodiments.

Figure 5B:
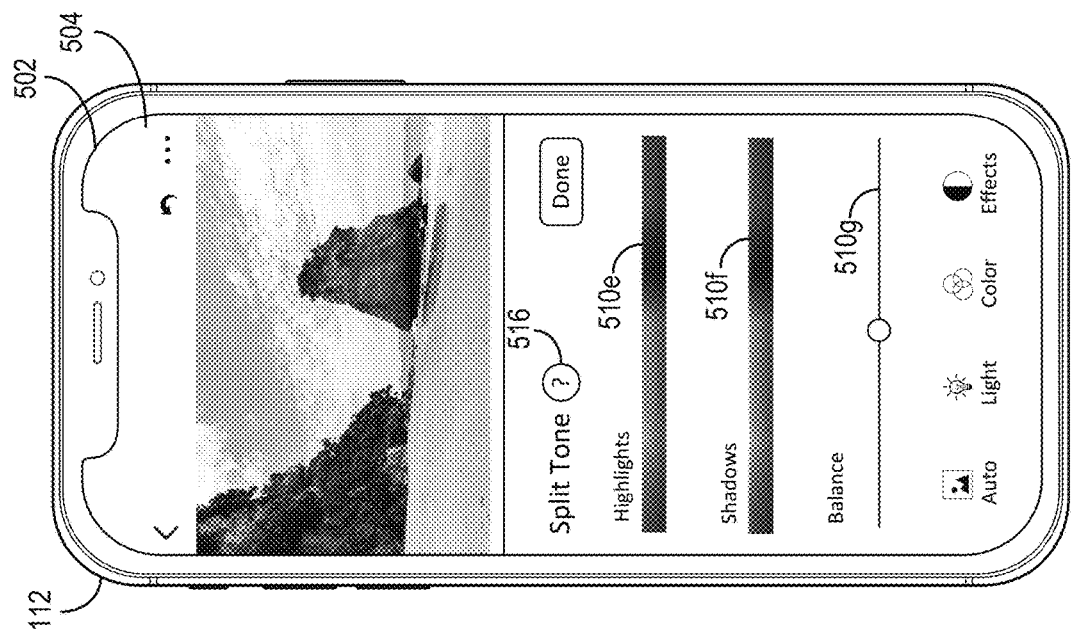
FIGS. 5A-5L illustrate a computing device with example user interfaces portraying one or more animated tutorials in accordance with one or more embodiments.
Figure 5A:
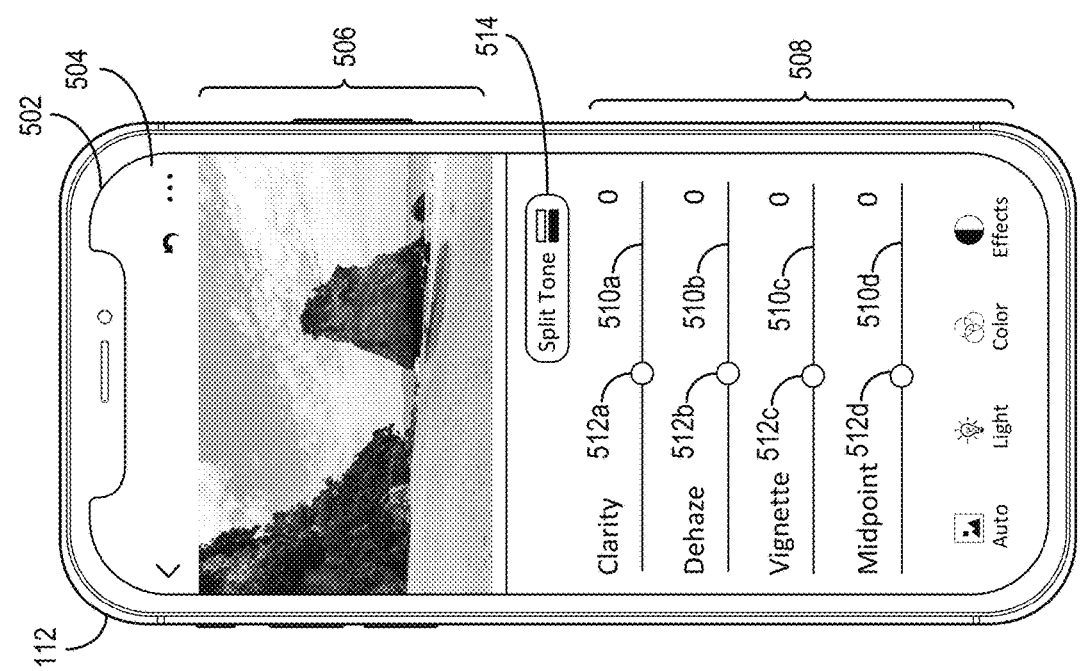

For example, FIG. 5A illustrates an image editing user interface 504 on a touch screen 502 of the client computing device 112. As shown, the image editing user interface 504 includes a digital image 506 (e.g., a digital image that is currently being edited by a user), as well as an editing tool panel 508. For example, the editing tool panel 508 includes editing tool sliders 510a, 510b, 510c, and 510d, each including a slide indicator 512a, 512b, 512c, and 512d. In response to slide touch gestures detected in connection with one or more of the slide indicators 512a-512d, the digital content editing system application 114 can alter one or more characteristics of the digital image 506.

In one or more embodiments, the digital content editing system application 114 can make other editing tools available via the image editing user interface 504. For example, as shown in FIG. 5B, in response to a detected selection of the split tone button 514, the digital content editing system application 114 can replace the editing tool sliders 510a-510d with editing tool sliders 510e, 510f, and 510g. In at least one embodiment, the editing tool sliders 510e-510g are specific to the split tone editing tool. For example, as shown in FIG. 5B, the editing tool sliders 510e and 510f are color spectrum sliders.

As discussed above, a user may not be familiar or knowledgeable in the use of the split tone editing tool. The smart tutorial system 102 can include the help button 516 to provide an indication that the smart tutorial system 102 can generate or provide animated tutorials associated with the split tone editing tool. In response to a detected selection of the help button 516 in association with the split tone editing tool, the digital content editing system application 114 can format and send a request to the digital content editing system 104 for one or more animated tutorials associated with the split tone editing tool.

Figure 5D:
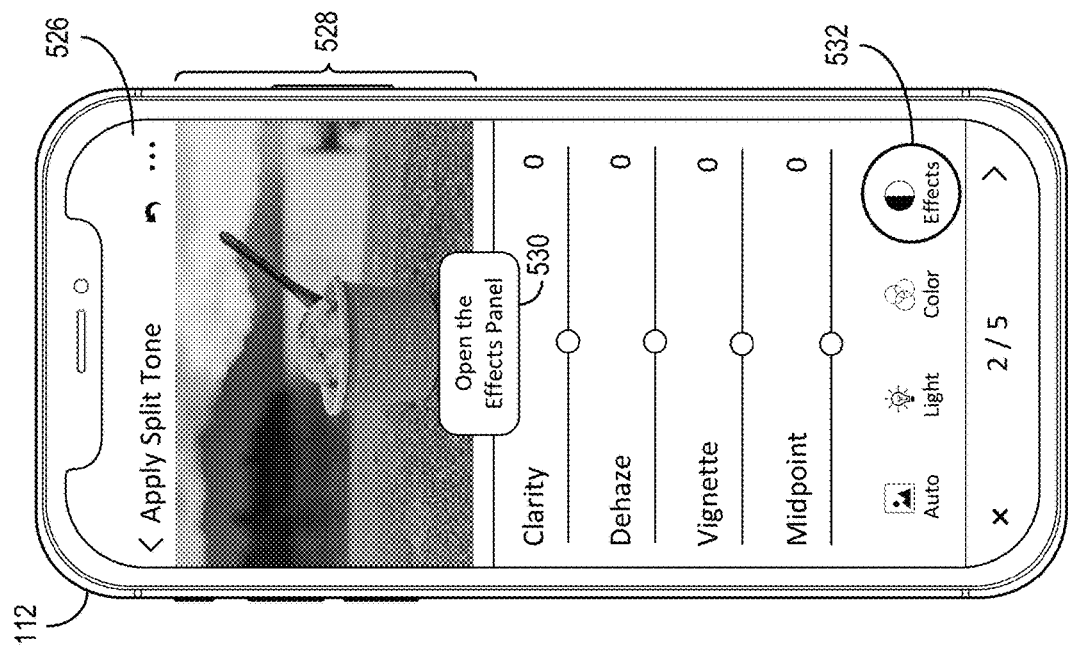
Figure 5C:
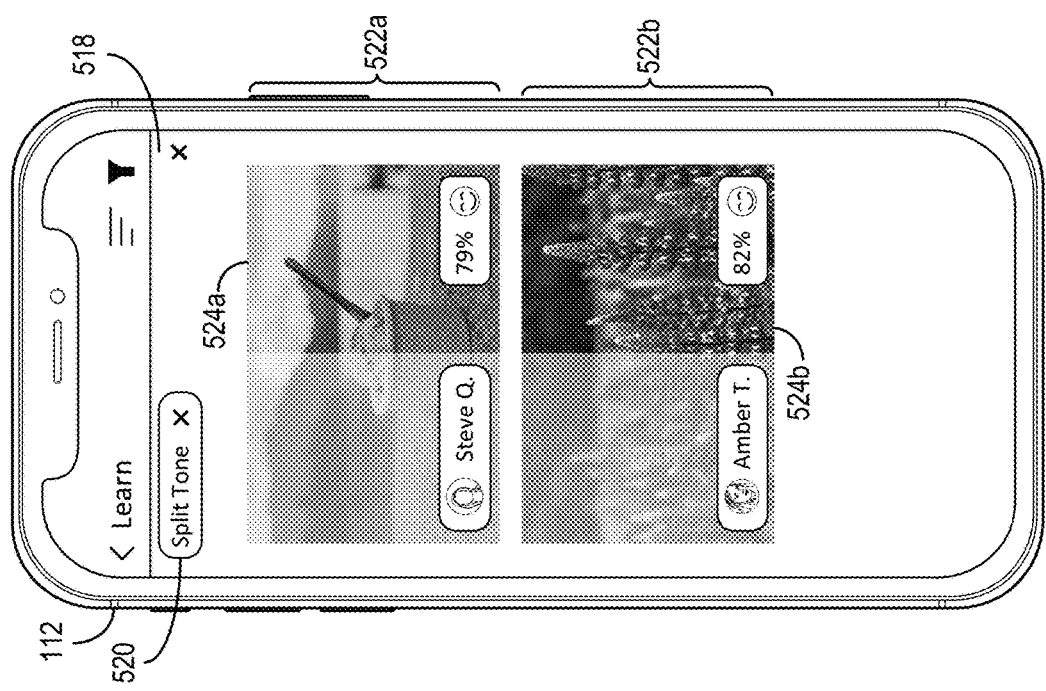

The smart tutorial system 102 can generate and/or provide the animated tutorials, as discussed above. For example, as shown in FIG. 5C, the digital content editing system application 114 can display the provided animated tutorials 522a, 522b in the tutorial selection user interface 518. As discussed above with reference to FIG. 4C, the smart tutorial system 102 can select the animated tutorial 522a in response to determining that the animated tutorial 522a has the highest ranking aesthetics gain in a first cluster. Similarly, the smart tutorial system 102 can select the animated tutorial 522b in response to determining that the animated tutorial 522b has the highest ranking aesthetics gain in a second cluster. Thus, because the smart tutorial system 102 selected the animated tutorials 522a, 522b from different clusters, each of the animated tutorials 522a, 522b is drawn to a different attribute or characteristic of the target image editing tool (e.g., the split tone tool). Additionally, because both of the animated tutorials 522a, 522b ranked highest in terms of aesthetics gain in their respective clusters, the smart tutorial system 102 is providing the client computing device 112 with animated tutorials that result in visually pleasing digital images.

As further shown in FIG. 5C, the digital content editing system application 114 displays a dynamic before-and-after digital image 524a, 524b to indicate each of the animated tutorials 522a, 522b, respectively. As discussed above with regard to FIG. 4A, the before-and-after digital images 524a, 524b reflect how the respective digital images change after application of the target image editing tool (e.g., the split tone tool). Additionally, the tutorial selection user interface 518 can include the image editing tool indicator 520.

In response to a detected selection of one of the animated tutorials 522a, 522b in the tutorial selection user interface 518, the digital content editing system application 114 can display the animated tutorial on the client computing device 112. For example, as shown in FIG. 5D, in response to the detected selection of the animated tutorial 522a, the digital content editing system application 114 can replace the tutorial selection user interface 518 with the animated tutorial user interface 526. As shown, the animated tutorial user interface 526 is similar to the image editing user interface 504 and the currently active animated tutorial instructs the user on how to interact with the displayed controls in order to successfully apply the associated image editing tool. For example, the animated tutorial can highlight how a slider should change, and then detects a corresponding user interaction. In other embodiments, the animated tutorial may be non-interactive where the selected animated tutorial plays within the animated tutorial user interface 526 like a movie.

As further shown in FIG. 5D, the animated tutorial user interface 526 includes the tutorial digital image 528 (e.g., the image being editing in the animated tutorial), the tutorial instructions 530, and other editing tool sliders and controls. In one or more embodiments, the tutorial instruction 530 states the action that should take place in the currently displayed step. For example, as shown in FIG. 5D, the tutorial instruction 530 states, "Open the effects panel." Accordingly, the animated tutorial user interface 526 also includes the action indicator 532 that indicates where a user interaction should take place in order to accomplish the instruction stated in the tutorial instruction 530. In at least one embodiment, the contents of the tutorial instruction 530 changes with each step of the animated tutorial 522a. For example, as shown in FIG. 5E, in the next step of the animated tutorial 522a, the tutorial instruction 530 states, "Open the split tone panel." Accordingly, the animated tutorial 522a further includes the action indicator 532 showing where the next user interaction should take place within the animated tutorial user interface 526 in order to accomplish the given instruction.

Figure 5F:
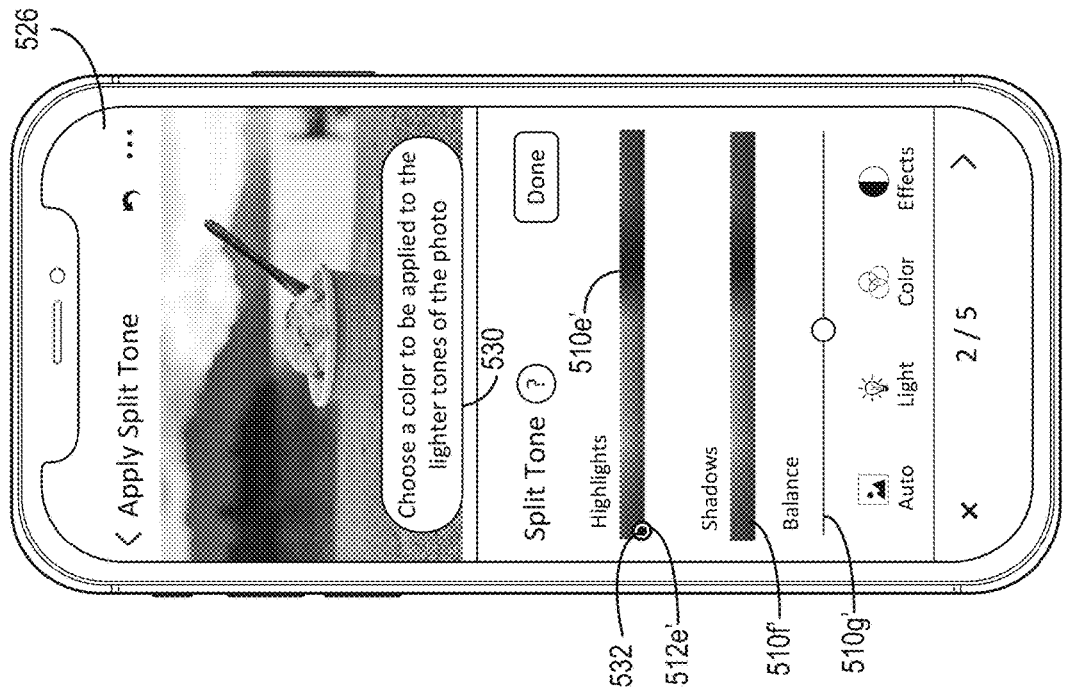
Figure 5E:
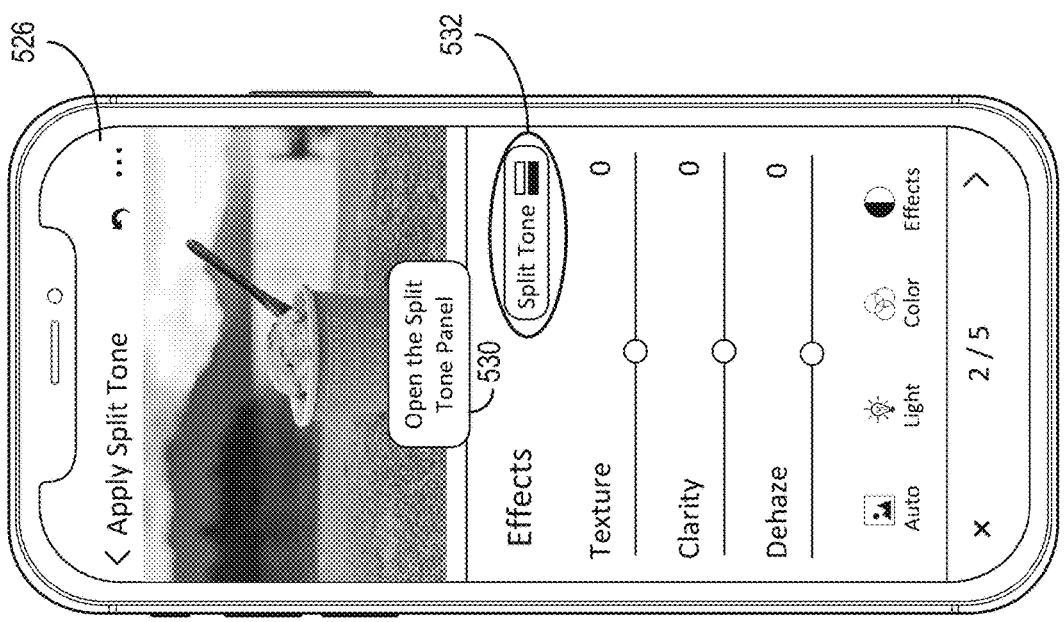
Figure 5H:
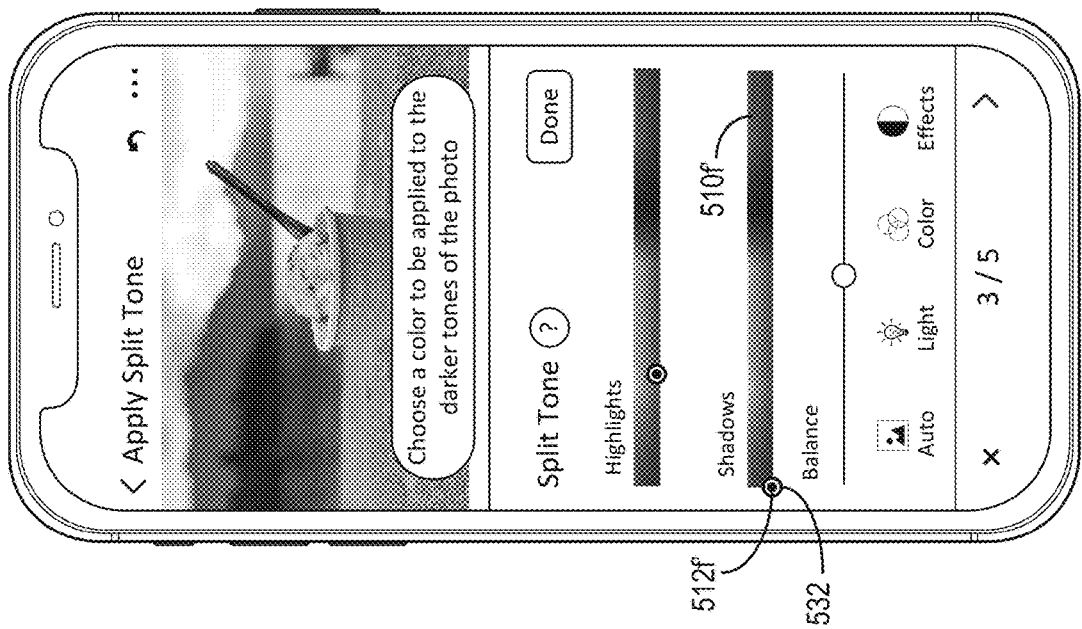
Figure 5G:
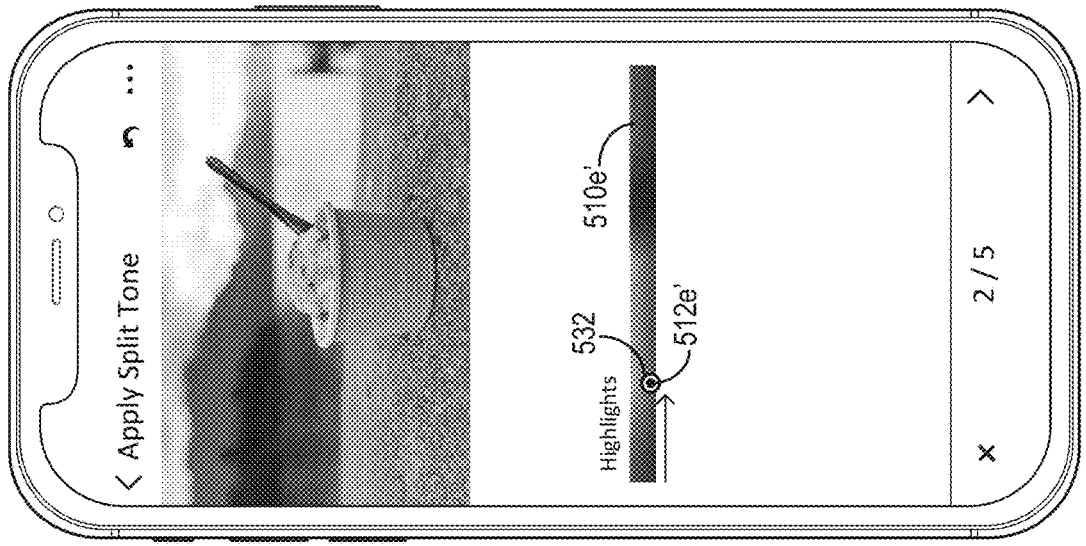

As shown in FIG. 5F, the animated tutorial 522a also includes steps showing how the tutorial digital image 528 changes in response to interactions with the editing tool sliders 510e', 510f', and 510g'. For example, as instructed by the tutorial instructions 530 in FIG. 5F (e.g., "Choose a color to be applied to the lighten tones of the photo."), the action indicator 532 shows how a user interaction should move the slide indicator 512e'. For instance, the animated tutorial 522a shows how the tutorial digital image 528 changes in response to the slide indicator 512e' moving from a starting position to an ending position indicated by the action indicator 532. In at least one embodiment, in order to further highlight the movement of the slide indicator 512e', the animated tutorial 522a can isolate the editing tool slider 510e', as shown in FIG. 5G.

Figure 5J:
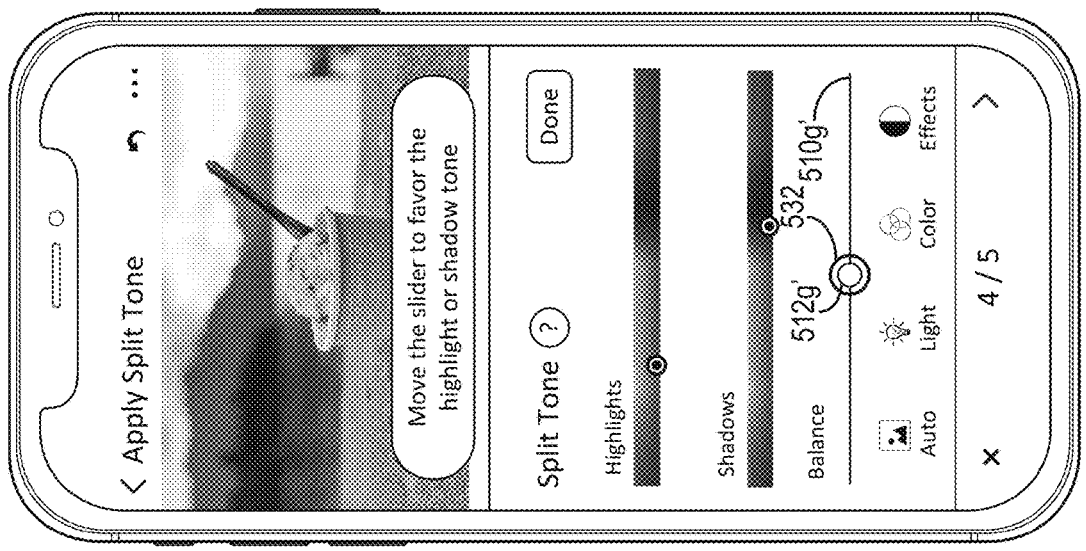
Figure 5I:
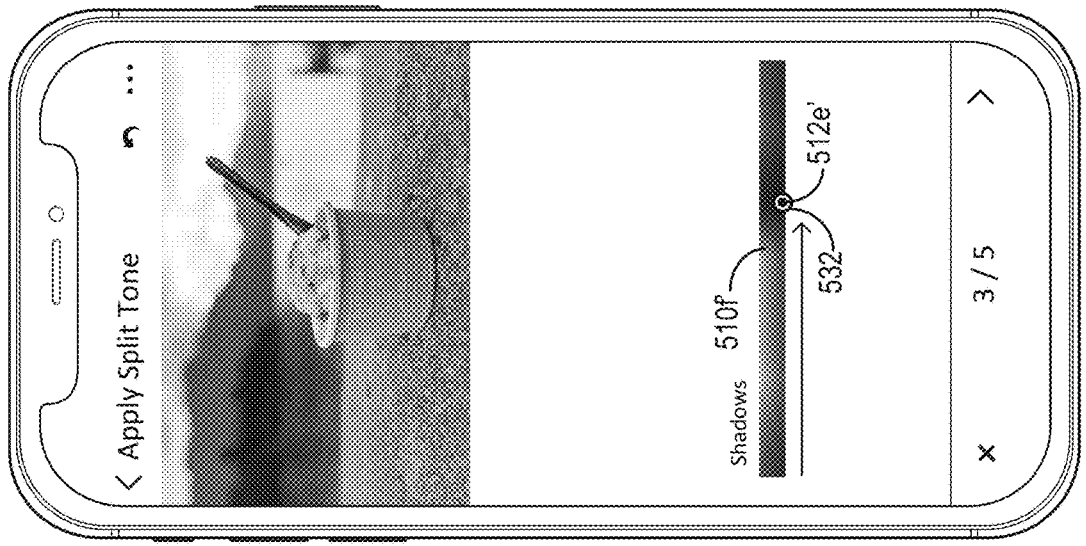
Figure 5L:
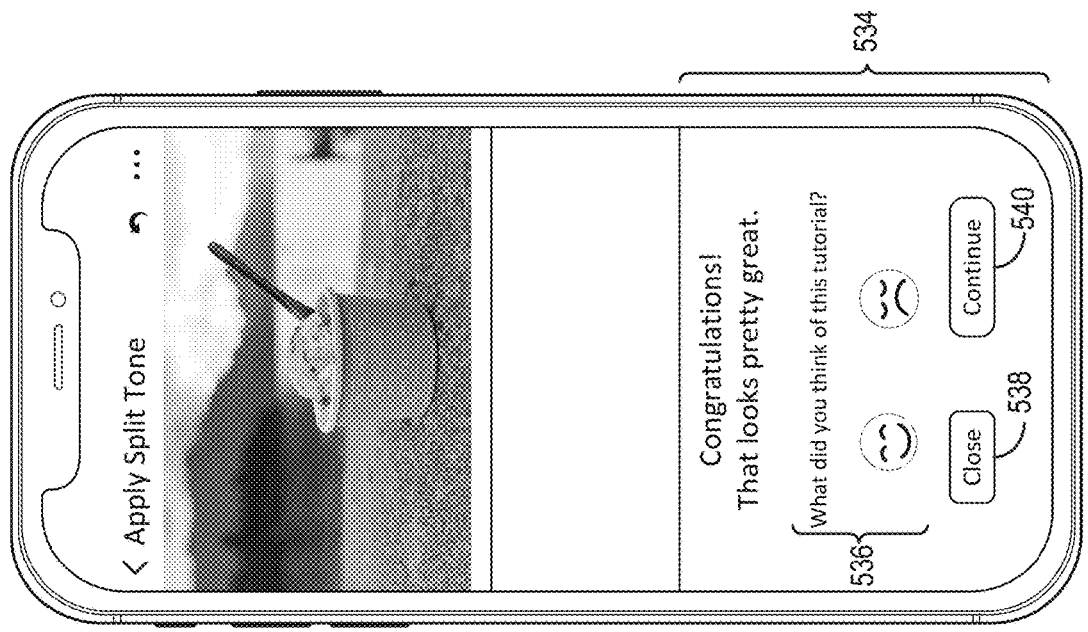
Figure 5K:
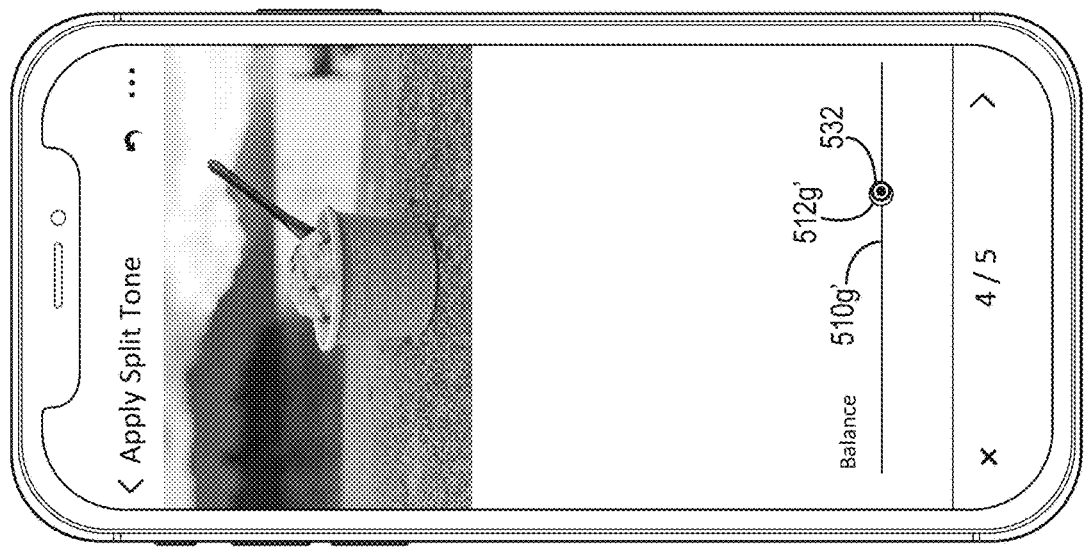

The animated tutorial 522a can further include steps directed to the other remaining editing tool sliders 510f' and 510g'. For example, as shown in FIG. 5H, the animated tutorial 522a includes a step that involves moving the slide indicator 512f' from a starting position on the editing tool slider 510f' to an ending position on the editing tool slider 510f, as shown in FIG. 5I and as indicated by the action indicator 532. Additionally, as shown in FIG. 5J, the animated tutorial 522a includes a step that involves moving the slide indicator 512g' from a starting position on the editing tool slider 510g' to an ending position on the editing tool slider 510g', as shown in FIG. 5K and as indicated by the action indicator 532.

In one or more embodiments, the animated tutorial 522a includes interactive controls that enable a user to rate and close the tutorial. For example, as shown in FIG. 5L, the animated tutorial 522a can include a statement 534 that includes a rating control 536, a close button 538, and a continue button 540. In response to a detected selection within the rating control 536, the digital content editing system application 114 can send the rating information to the digital content editing system 104. Additionally, in response to a detected selection of the close button 538, the digital content editing system application 114 can close the animated tutorial 522a and return to the image editing user interface 504. In response to a detected selection of the continue button 540, the digital content editing system application 114 can close the animated tutorial 522a and return to the tutorial selection user interface 518.

Figure 6:
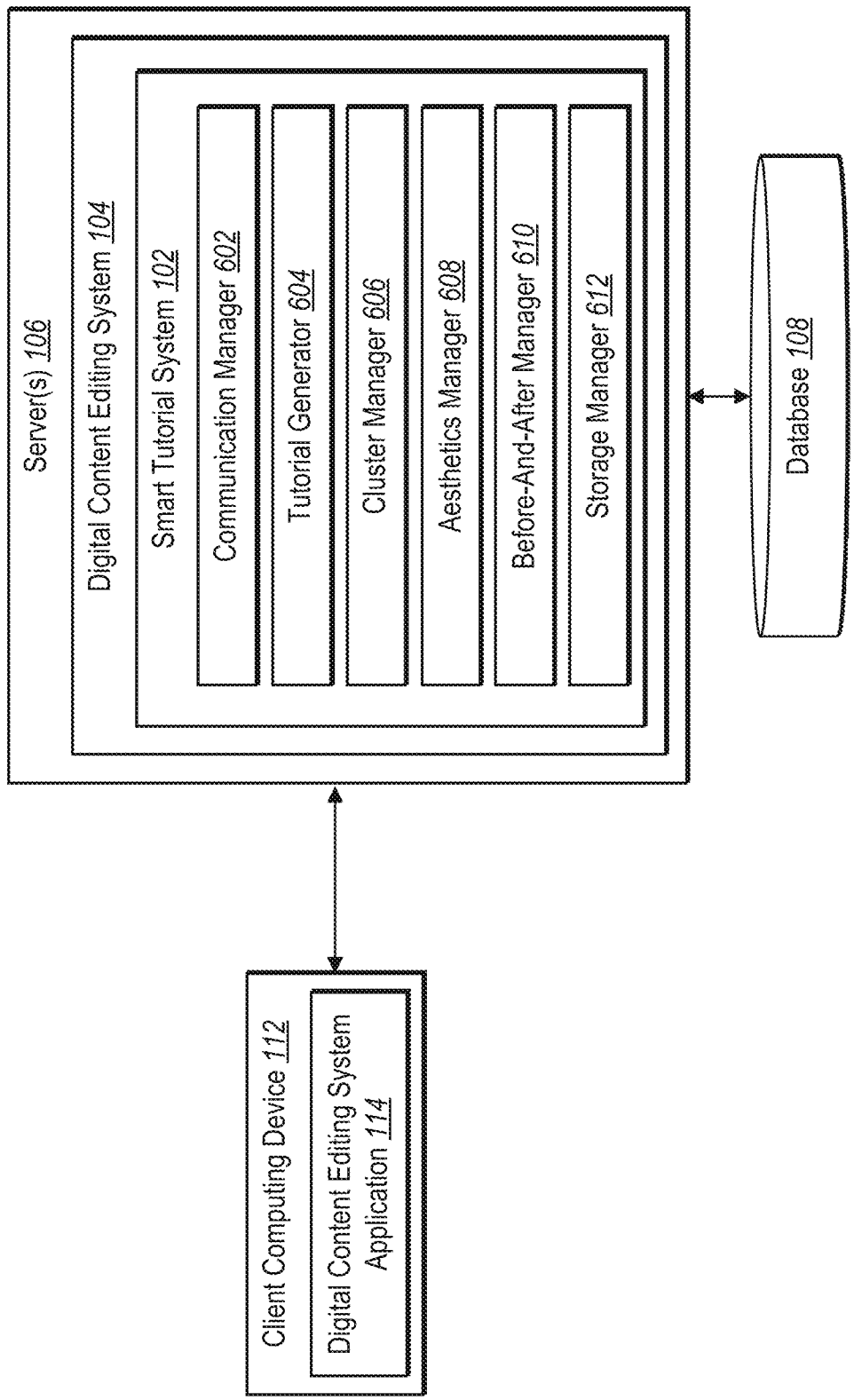
FIG. 6 illustrates a schematic diagram of the smart tutorial system in accordance with one or more embodiments.

As described in relation to FIGS. 1-5L, the smart tutorial system 102 generates animated tutorials associated with an image editing tool. FIG. 6 illustrates a detailed schematic diagram of an embodiment of the smart tutorial system 102 described above. Although illustrated on the server device 106, as mentioned above, the smart tutorial system 102 can be implemented by one or more different or additional computing devices (e.g., the client computing device 112). In one or more embodiments, the smart tutorial system 102 includes a communication manager 602, a tutorial generator 604, a cluster manager 606, an aesthetics manager 608, and a before-and-after manager 610.

Each of the components 602-610 of the smart tutorial system 102 can include software, hardware, or both. For example, the components 602-610 can include one or more instructions stored on a computer-readable storage medium and executable by processors of one or more computing devices, such as a client device or server device. When executed by the one or more processors, the computer-executable instructions of the smart tutorial system 102 can cause the computing device(s) to perform the methods described herein. Alternatively, the components 602-610 can include hardware, such as a special-purpose processing device to perform a certain function or group of functions. Alternatively, the components 602-610 of the smart tutorial system 102 can include a combination of computer-executable instructions and hardware.

Furthermore, the components 602-610 of the smart tutorial system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-610 may be implemented as a stand-alone application, such as a desktop or mobile application. Furthermore, the components 602-610 may be implemented as one or more web-based applications hosted on a remote server. The components 602-610 may also be implemented in a suite of mobile device applications or "apps." To illustrate, the components 602-610 may be implemented in an application, including but not limited to ADOBE CREATIVE CLOUD, such as ADOBE PHOTOSHOP, ADOBE ACROBAT, ADOBE ILLUSTRATOR, and ADOBE® INDESIGN. "ADOBE", "CREATIVE CLOUD," "PHOTOSHOP," "ACROBAT," "ILLUSTRATOR," and "INDESIGN" are either registered trademarks or trademarks of Adobe Inc. in the United States and/or other countries.

As mentioned above, and as shown in FIG. 6, the smart tutorial system 102 includes a communication manager 602. In one or more embodiments, the communication manager 602 handles communications between the smart tutorial system 102 and other computing devices. For example, the communication manager 602 can send and receive information to and from the client computing device 112. To illustrate, the communication manager 602 can provide animated tutorials, user interfaces, interface elements, and other information to the client computing device 112. The communication manager 602 can also receive indications of user selections and requests associated with an image editing tool from the client computing device 112. As mentioned above, in one or more embodiments, the communication manager 602 can send and receive information to the client computing device 112 via the digital content editing system application 114 installed on the client computing device 112.

As mentioned above, and as shown in FIG. 6, the smart tutorial system 102 includes the tutorial generator 604. In one or more embodiments, the tutorial generator 604 generates animated tutorials corresponding to an image editing tool. For example, the tutorial generator 604 can identify existing animated tutorials in the database 108 that include steps corresponding to the image editing tool. The tutorial generator 604 further generates a mapping of the identified steps and compiles the identified steps into an animated tutorial. In at least one embodiment, the tutorial generator 604 compiles the identified steps into a portable tutorial format that is compatible with a range of digital content editing system applications.

Also as shown in FIG. 6, the smart tutorial system 102 includes the cluster manager 606. In one or more embodiments, the cluster manager 606 generates clusters and sub-clusters of animated tutorials as a way of grouping the animated tutorials by similarity. For example, the cluster manager 606 can utilize K-Means clustering to generate the clusters and sub-clusters of animated tutorials. The cluster manager 606 can generate clusters based on a cluster number indicated by a user of the client computing device 112. Additionally or alternatively, the cluster manager 606 can automatically generate any number of clusters in order to load balance the grouped animated tutorials.

As mentioned above, and as shown in FIG. 6, the smart tutorial system 102 includes the aesthetics manager 608. In one or more embodiments, the aesthetics manager 608 determines aesthetics gains associated with animated tutorials. For example, the aesthetics manager 608 can train and maintain the image aesthetics predictor computing model. The aesthetics manager 608 can further apply the trained image aesthetics predictor computing model to digital images to determine aesthetics scores for the digital images. Additionally, the aesthetics manager 608 can utilize determined aesthetics scores associated with images from an animated tutorial to determine an aesthetic gain for the animated tutorial.

As mentioned above, and as shown in FIG. 6, the smart tutorial system 102 includes the before-and-after manager 610. In one or more embodiments, the before-and-after manager 610 generates dynamic before-and-after digital images. For example, the before-and-after manager 610 can generate a first digital image representing a first set of parameters (e.g., control/slider values) prior to application of the image editing tool within the animated tutorial, and a second digital image representing a second set of parameters (e.g., control/slider values) after application of the image editing tool within the animated tutorial. The before-and-after manager 610 can then append the first and second digital images to generate a dynamic before-and-after digital image.

As mentioned above, and as shown in FIG. 6, the smart tutorial system 102 includes the storage manager 612. In one or more embodiments, the storage manager 612 (via one or more memory devices) handles storage, retrieval, and maintenance of animated tutorials within the database 108. For example, the storage manager 612 can store and retrieve existing animated tutorials in order for the smart tutorial system 102 to generate new animated tutorials that are specific to a target image editing tool. Additionally, the storage manager 612 can store ordered sets of animated tutorials in the database 108 indexed by the image editing tool referenced by each set.

Figure 7:
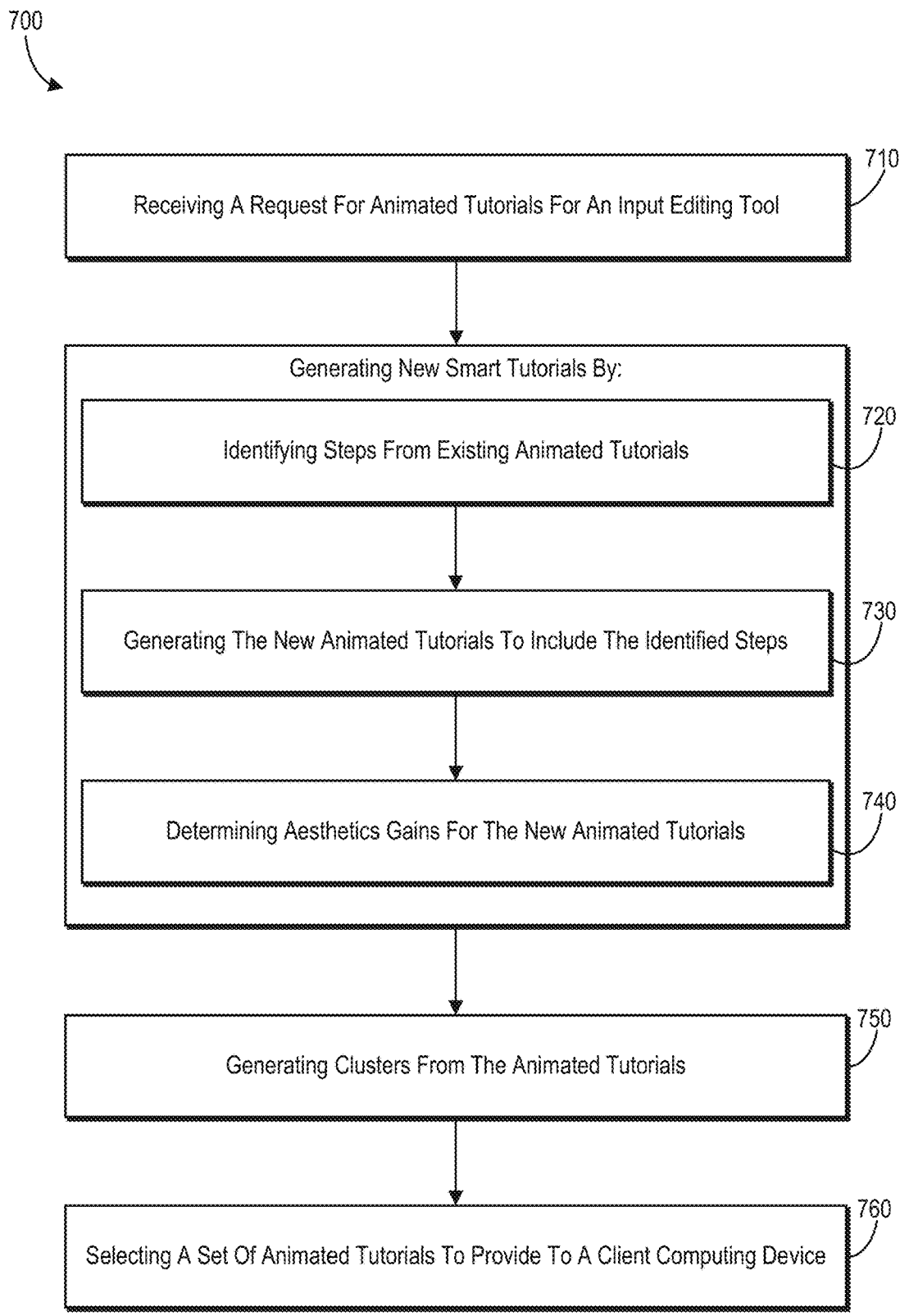
FIG. 7 illustrates a flowchart of a series of acts for generating an animated tutorial in accordance with one or more embodiments.

FIGS. 1-6, the corresponding text, and the examples provide a number of different methods, systems, devices, and non-transitory computer-readable media of the smart tutorial system 102. In addition to the foregoing, one or more embodiments can also be described in terms of flowcharts comprising acts for accomplishing a particular result, as shown in FIG. 7. FIG. 7 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for generating animated tutorials corresponding to an image editing tool in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As shown in FIG. 7, the series of acts 700 includes an act 710 of receiving a request for animated tutorials for an image editing tool. For example, the act 710 can involve receiving a request for one or more animated tutorials corresponding to an image editing tool. In one or more embodiments, receiving a request for one or more animated tutorials corresponding to an image editing tool includes receiving the request in response to a detected user selection on a client computing device.

Additionally, the series of acts 700 includes an act 720 of generating animated tutorials by identifying steps from existing animated tutorials. For example, the act 720 can involve generating a plurality of animated tutorials corresponding to the image editing tool from the plurality of existing animated tutorials by identifying subsets of steps in the plurality of existing animated tutorials corresponding to the image editing tool.

Furthermore, the series of acts 700 includes an act 730 of further generating animated tutorials to include the identified steps. For example, the act 730 can involve generating a plurality of animated tutorials corresponding to the image editing tool from the plurality of existing animated tutorials to include the subsets of steps in the plurality of existing animated tutorials corresponding to the image editing tool. In at least one embodiment, generating the plurality of animated tutorials can include generating dynamic before-and-after digital images associated with the plurality of animated tutorials by: identifying, based on the plurality of animated tutorials, first digital images prior to application of the image editing tool; identifying, based on the plurality of animated tutorials, second digital images after application of the image editing tool; and generating the dynamic before-and-after digital images based on the first digital images and the second digital images.

The series of acts 700 also includes an act 740 of further generating animated tutorials by determining aesthetics gains for the animated tutorials. For example, the act 740 can involve generating a plurality of animated tutorials corresponding to the image editing tool from the plurality of existing animated tutorials by determining aesthetics gains associated with the subsets of steps of the plurality of animated tutorials. In one or more embodiments, determining aesthetics gains associated with the subsets of steps of the plurality of animated tutorials includes comparing the first digital images and the second digital images. Furthermore, determining aesthetics gains associated with the subsets of steps of the plurality of animated tutorials can include utilizing an image aesthetics predictor computing model trained with ground truth digital image aesthetics training data.

In additional embodiments, determining aesthetics gains for animated tutorials includes: generating a first digital images corresponding to the animated tutorials based on a first sets of parameters prior to application of the image editing tool; generating a second digital images corresponding to the animated tutorials based on a second sets of parameters after application of the image editing tool; and generating an aesthetics scores associated with the animated tutorials based on comparing the first digital image and the second digital image. In at least one embodiment, the series of acts 700 also includes generating a dynamic before-and-after digital images corresponding to the animated tutorials based on the first sets of parameters prior to application of the image editing tool and the second sets of parameters after application of the image editing tool as part of generating the plurality of animated tutorials.

In at least one embodiment, the series of acts 700 further includes generating the plurality of animated tutorials comprising the sets of steps by configuring the steps that correspond to the image editing tool into a portable tutorial format executable across a plurality of image editing applications.

The series of acts 700 also includes an act 740 of generating clusters from the animated tutorials. For example, the act 740 can involve generating a plurality of clusters from the plurality of animated tutorials. In one or more embodiments, generate the plurality of clusters from the plurality of animated tutorials includes: determining a first set of parameters of the image editing tool corresponding to a first animated tutorial from the plurality of animated tutorials; determining a second set of parameters of the image editing tool corresponding to a second animated tutorial from the plurality of animated tutorials; and generating the plurality of clusters by applying a clustering algorithm to the first set of parameters of the image editing tool corresponding to a first animated tutorial and the second set of parameters of the image editing tool corresponding to the second animated tutorial.

The series of acts 700 further includes an act 750 of selecting a set of animated tutorials to provide to a client computing device. For example, the act 750 can involve selecting a set of animated tutorials to provide in response to the request based on the plurality of clusters and the aesthetics gains. In one or more embodiments, selecting a set of animated tutorials to provide in response to the request based on the plurality of clusters and the aesthetic gains can include: identifying animated tutorials in a first cluster; determining a ranking of the animated tutorials in the first cluster based on a set of aesthetics gains corresponding to the set of animated tutorials; and adding, based on the ranking, at least one animated tutorial from the animated tutorials in the first cluster of the set of animated tutorials to provide in response to the request. In at least one embodiment, the series of acts 700 includes determining a ranking of the set of animated tutorials to provide in response to the request based on a plurality of aesthetics gains corresponding to the set of animated tutorials; and providing, for display on a client computing device, the selected set of animated tutorials based on the ranking. Thus, in at least one embodiment, the series of acts 700 can include selecting the set of animated tutorials to provide in response to the request by selecting the top ranked animated tutorial with respect to the aesthetic gains in each of the plurality of clusters. Additionally, in one or more embodiments, the series of acts 700 can include providing, for display on a client computing device, the selected set of animated tutorials such that the selected set of animated tutorials displays on the client computing device with a selectable before-and-after digital image representing each of the selected set of animated tutorials In addition (or in the alternative) to the acts described above, in some embodiments, the series of acts 700 can include performing a step for generating animated tutorials corresponding to the image editing tool from a plurality of existing animated tutorials. For instance, the acts and algorithms described above in relation to FIGS. 2-4C can comprise the corresponding acts (or structure) for a step for generating animated tutorials corresponding to the image editing tool from a plurality of existing animated tutorials.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa).

For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
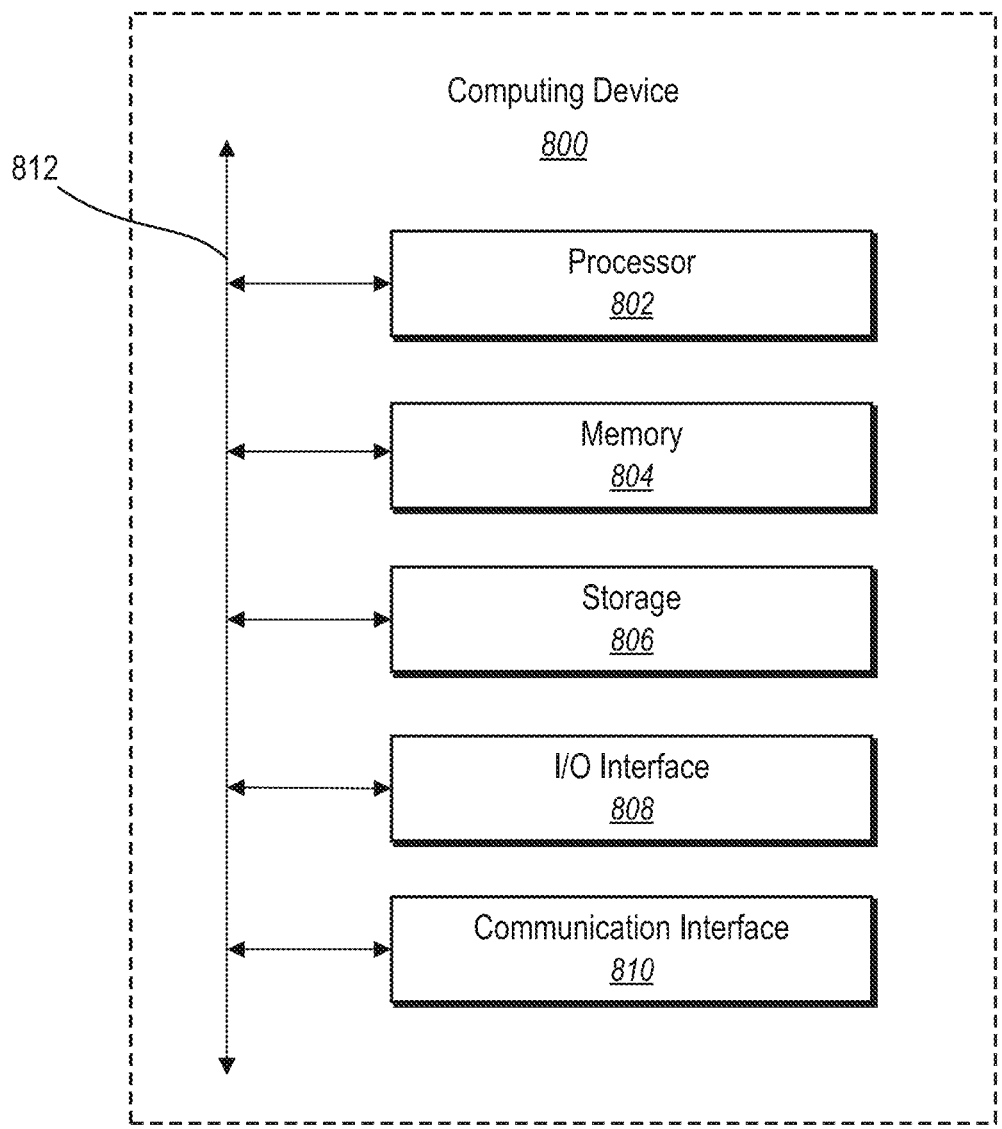
FIG. 8 illustrates a block diagram of an example computing device in accordance with one or more embodiments.

FIG. 8 illustrates a block diagram of an example computing device 800 that may be configured to perform one or more of the processes described above. One will appreciate that one or more computing devices, such as the computing device 800 may represent the computing devices described above (e.g., the server device 106, and the client computing devices 112). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

We claim:

1. A non-transitory computer-readable storage medium storing instructions thereon that, when executed by at least one processor, cause a computer system to:
   receive a request for one or more animated tutorials corresponding to an image editing tool;
   generate a plurality of animated tutorials corresponding to the image editing tool from a plurality of existing animated tutorials;
   determine aesthetics gains for the plurality of animated tutorials by comparing a first set of aesthetic values prior to application of the image editing tool and a second set of aesthetic values after application of the image editing tool;
   generate a plurality of clusters from the plurality of animated tutorials;
   determine a ranking of animated tutorials of a first cluster based on a set of aesthetics gains corresponding to the animated tutorials; and
   select a set of animated tutorials from the plurality of animated tutorials to provide in response to the request based on the plurality of clusters and the aesthetics gains by adding, based on the ranking, at least one animated tutorial from the animated tutorials in the first cluster to the set of animated tutorials to provide in response to the request.

2. The non-transitory computer-readable storage medium as recited in claim 1, further comprising instructions that, when executed by the at least one processor, cause the computer system to generate the plurality of animated tutorials corresponding to the image editing tool from the plurality of existing animated tutorials by:
   identifying a subset of the plurality of existing animated tutorials corresponding to the image editing tool; and
   generating the plurality of animated tutorials based on the subset of the plurality of existing animated tutorials.

3. The non-transitory computer-readable storage medium as recited in claim 2, wherein identifying the subset of the plurality of existing animated tutorials corresponding to the image editing tool comprises:
   identifying existing animated tutorials with steps that correspond to the image editing tool; and
   extracting the steps from the existing animated tutorials to generate the plurality of animated tutorials.

4. The non-transitory computer-readable storage medium as recited in claim 3, further storing instructions thereon that, when executed by the at least one processor, cause the computer system to generate the plurality of animated tutorials comprising the steps by configuring the steps that correspond to the image editing tool into a portable tutorial format executable across a plurality of image editing applications.

5. The non-transitory computer-readable storage medium as recited in claim 1, further comprising instructions that, when executed by the at least one processor, cause the computer system to determine an aesthetics gain for an animated tutorial of the plurality of animated tutorials by:
   generating a first digital image corresponding to the animated tutorial based on a first set of parameters prior to application of the image editing tool;
   generating a second digital image corresponding to the animated tutorial based on a second set of parameters after application of the image editing tool; and
   generating an aesthetics score associated with the animated tutorial based on comparing the first digital image and the second digital image.

6. The non-transitory computer-readable storage medium as recited in claim 5, wherein generating the plurality of animated tutorials corresponding to the image editing tool from the plurality of existing animated tutorials further comprises generating a dynamic before-and-after digital image corresponding to the animated tutorial based on the first set of parameters prior to application of the image editing tool and the second set of parameters after application of the image editing tool.

7. The non-transitory computer-readable storage medium as recited in claim 1, further comprising instructions that, when executed by the at least one processor, cause the computer system to generate the plurality of clusters from the plurality of animated tutorials by:
   determining a first set of parameters of the image editing tool corresponding to a first animated tutorial from the plurality of animated tutorials;
   determining a second set of parameters of the image editing tool corresponding to a second animated tutorial from the plurality of animated tutorials; and
   generating the plurality of clusters by applying a clustering algorithm to the first set of parameters of the image editing tool corresponding to a first animated tutorial and the second set of parameters of the image editing tool corresponding to the second animated tutorial.

8. The non-transitory computer-readable storage medium as recited in claim 1, wherein further comprising instructions that, when executed by the at least one processor, cause the computer system to select a set of animated tutorials to provide in response to the request based on the plurality of clusters and the aesthetics gains by:

adding the at least one animated tutorial based on determining that at least one aesthetics gain corresponding to the at least one animated tutorial satisfies a threshold aesthetics gain.

9. The non-transitory computer-readable storage medium as recited in claim 1, further storing instructions thereon that, when executed by the at least one processor, cause the computer system to:

provide, for display on a client computing device, the selected set of animated tutorials based on the ranking.

10. A system comprising:
one or more memory devices comprising a plurality of existing animated tutorials; and
one or more server devices configured to cause the system to:
receive a request for one or more animated tutorials corresponding to an image editing tool;
generate a plurality of animated tutorials corresponding to the image editing tool from the plurality of existing animated tutorials by:
extracting subsets of steps corresponding to the image editing tool from the plurality of existing animated tutorials;
generating the plurality of animated tutorials utilizing the extracted subsets of steps corresponding to the image editing tool from the plurality of existing animated tutorials; and
determining aesthetics gains associated with the subsets of steps of the plurality of animated tutorials by comparing a first set of aesthetic values prior to application of the subsets of steps and a second set of aesthetic values after application of the subsets of steps;
generate a plurality of clusters from the plurality of animated tutorials based on the subsets of steps; and
select a set of animated tutorials to provide in response to the request by selecting animated tutorials from the plurality of clusters based on the aesthetics gains.

11. The system as recited in claim 10, wherein the one or more server devices are further configured to cause the system to generate the plurality of animated tutorials comprising the subsets of steps in the plurality of existing animated tutorials corresponding to the image editing tool by configuring the subsets of steps into a portable tutorial format.

12. The system as recited in claim 10, wherein the one or more server devices are further configured to cause the system to generate the plurality of animated tutorials comprising the subsets of steps in the plurality of existing animated tutorials corresponding to the image editing tool by generating dynamic before-and-after digital images associated with the plurality of animated tutorials by:

identifying, based on the plurality of animated tutorials, first digital images prior to application of the image editing tool;
identifying, based on the plurality of animated tutorials, second digital images after application of the image editing tool; and
generating the dynamic before-and-after digital images based on the first digital images and the second digital images.

13. The system as recited in claim 12, wherein determining aesthetics gains associated with the subsets of steps of the plurality of animated tutorials comprises comparing the first digital images and the second digital images.

14. The system as recited in claim 13, wherein determining the aesthetics gains associated with the subsets of steps of the plurality of animated tutorials further comprises utilizing an image aesthetics predictor computing model trained with ground truth digital image aesthetics training data.

15. The system as recited in claim 14, wherein the one or more server devices are further configured to cause the system to generate the plurality of clusters from the plurality of animated tutorials based on the subsets of steps by:

determining a first set of parameters of the image editing tool corresponding to a first animated tutorial from the plurality of animated tutorials;
determining a second set of parameters of the image editing tool corresponding to a second animated tutorial from the plurality of animated tutorials; and
generating the plurality of clusters by applying a clustering algorithm to the first set of parameters of the image editing tool corresponding to the first animated tutorial and the second set of parameters of the image editing tool corresponding to the second animated tutorial.

16. The system as recited in claim 15, wherein the one or more server devices are further configured to cause the system to rank the subsets of animated tutorials within the plurality of clusters by:

identifying animated tutorials in a first cluster;
determining a ranking of the animated tutorials in the first cluster based on a set of aesthetics gains corresponding to the animated tutorials; and
adding, based on the ranking, at least one animated tutorial from the animated tutorials in the first cluster to the set of animated tutorials to provide in response to the request.

17. The system as recited in claim 16, wherein the one or more server devices are further configured to cause the system to select the set of animated tutorials to provide in response to the request by selecting a top ranked animated tutorial with respect to aesthetics gains in each of the plurality of clusters.

18. The system as recited in claim 17, wherein the one or more server devices are further configured to cause the system to provide, for display on a client computing device, the selected set of animated tutorials such that the selected set of animated tutorials displays on the client computing device with a selectable before-and-after digital image.

19. A computer-implemented method comprising:
receiving a request for an animated tutorial corresponding to an image editing tool;
generating a plurality of animated tutorials corresponding to the image editing tool from a plurality of existing animated tutorials by:
extracting subsets of steps corresponding to the image editing tool from the plurality of existing animated tutorials;
generating the plurality of animated tutorials utilizing the extracted subsets of steps corresponding to the image editing tool from the plurality of existing animated tutorials; and
determining aesthetics gains associated with the subsets of steps of the plurality of animated tutorials by comparing a first set of aesthetic values prior to application of the subsets of steps and a second set of aesthetic values after application of the subsets of steps;

generating a cluster from the plurality of animated tutorials based on the subsets of steps; and selecting an animated tutorial to provide in response to the request by selecting an animated tutorial from the cluster based on the aesthetics gains.

20. The computer-implemented method as recited in claim 19, further comprising generating the plurality of animated tutorials by configuring the subsets of steps into a portable tutorial format.

* * * * *